(12) United States Patent
Lee et al.

(10) Patent No.: US 12,321,412 B1
(45) Date of Patent: Jun. 3, 2025

(54) MANAGEMENT OF ELECTRONICALLY PUBLISHED COLLECTIONS OF CONTENT

(71) Applicant: Snap Inc., Venice, CA (US)

(72) Inventors: Howard C. Lee, Los Angeles, CA (US); William Spencer Mulligan, Marina del Rey, CA (US); Todd Seth Sherman, Los Angeles, CA (US); Weiping Si, Los Angeles, CA (US); Yamill Antonio Vallecillo, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 643 days.

(21) Appl. No.: 15/836,489

(22) Filed: Dec. 8, 2017

Related U.S. Application Data

(60) Provisional application No. 62/473,735, filed on Mar. 20, 2017.

(51) Int. Cl.
  *G06F 16/958* (2019.01)
  *G06F 16/21* (2019.01)
  (Continued)

(52) U.S. Cl.
  CPC ............ *G06F 16/958* (2019.01); *G06F 16/21* (2019.01); *G06Q 50/01* (2013.01);
  (Continued)

(58) Field of Classification Search
  CPC ....... G06F 16/958; G06F 16/21; G06Q 50/01; H04L 65/10063; H04L 65/1063; H04N 21/854; H04N 21/601
  (Continued)

(56) References Cited

U.S. PATENT DOCUMENTS 5,754,939 A    5/1998   Herz et al.
6,038,295 A    3/2000   Mattes
             (Continued)

FOREIGN PATENT DOCUMENTS

CA     2887596     7/2015
WO    2012000107   1/2012
             (Continued)

OTHER PUBLICATIONS

Castelluccia, Claude, "EphPub: Toward robust Ephemeral Publishing", 19th IEEE International Conference on Network Protocols (ICNP), (Oct. 17, 2011).
(Continued)

*Primary Examiner* — Tony Mahmoudi
*Assistant Examiner* — Kamal K Dewan
(74) *Attorney, Agent, or Firm* — Schwegman Lundberg & Woessner, P.A.

(57) ABSTRACT

Aspects of the present disclosure involve a system comprising a computer-readable storage medium storing at least one program, and a method for managing electronically published collections of content. The method may include accessing a content collection that comprises one or more content items ordered in a sequence. The method further includes causing presentation of a tile on a display of a client device, the tile comprising a thumbnail image indicating an existence of the content collection. The method further includes accessing an update to the content collection comprising a new content item, and publishing the update by inserting the new content item into the content collection, updating the tile based at least on the new content item being inserted into the content collection, and updating a read point of the content collection based on the new content item.

20 Claims, 17 Drawing Sheets

(51) Int. Cl.
*G06Q 50/00* (2024.01)
*H04L 65/1063* (2022.01)
*H04L 65/75* (2022.01)
*H04N 21/854* (2011.01)

(52) U.S. Cl.
CPC ........ *H04L 65/1063* (2013.01); *H04L 65/75* (2022.05); *H04N 21/854* (2013.01)

(58) Field of Classification Search
USPC ....................................................... 707/671
See application file for complete search history.

(56) References Cited

U.S. PATENT DOCUMENTS

| | | | |
|---|---|---|---|
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,912,896 B2 | 3/2011 | Wolovitz et al. | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,874,677 B2 | 10/2014 | Rosen et al. | |
| 8,909,679 B2 | 12/2014 | Roote et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell | |
| 2003/0135558 A1* | 7/2003 | Bellotti ............. | G06Q 10/107 709/206 |
| 2003/0217106 A1 | 11/2003 | Adar et al. | |
| 2004/0203959 A1 | 10/2004 | Coombes | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2005/0246369 A1* | 11/2005 | Oreizy ................ | G06Q 10/10 |
| 2006/0159109 A1* | 7/2006 | Lamkin ................ | G11B 27/34 370/401 |
| 2006/0161635 A1* | 7/2006 | Lamkin .............. | G06F 16/4387 709/217 |
| 2006/0242239 A1 | 10/2006 | Morishima et al. | |
| 2006/0270419 A1 | 11/2006 | Crowley et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0214216 A1 | 9/2007 | Carrer et al. | |
| 2007/0233801 A1 | 10/2007 | Eren et al. | |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2009/0204885 A1* | 8/2009 | Ellsworth ............... | G06F 16/44 707/999.1 |
| 2010/0082427 A1 | 4/2010 | Burgener et al. | |
| 2010/0131880 A1 | 5/2010 | Lee et al. | |
| 2010/0185665 A1 | 7/2010 | Horn et al. | |
| 2010/0306669 A1 | 12/2010 | Della Pasqua | |
| 2011/0099507 A1 | 4/2011 | Nesladek et al. | |
| 2011/0145564 A1 | 6/2011 | Moshir et al. | |
| 2011/0202598 A1 | 8/2011 | Evans et al. | |
| 2011/0213845 A1 | 9/2011 | Logan et al. | |
| 2011/0286586 A1 | 11/2011 | Saylor et al. | |
| 2011/0320373 A1 | 12/2011 | Lee et al. | |
| 2012/0028659 A1 | 2/2012 | Whitney et al. | |
| 2012/0173339 A1* | 7/2012 | Flynt .................. | G06Q 30/0241 705/14.58 |
| 2012/0184248 A1 | 7/2012 | Speede | |
| 2012/0209921 A1 | 8/2012 | Adafin et al. | |
| 2012/0209924 A1 | 8/2012 | Evans et al. | |
| 2012/0254325 A1 | 10/2012 | Majeti et al. | |
| 2012/0278692 A1 | 11/2012 | Shi | |
| 2012/0304080 A1 | 11/2012 | Wormald et al. | |
| 2013/0007659 A1* | 1/2013 | Muller ................ | G06F 16/3326 715/810 |
| 2013/0071093 A1 | 3/2013 | Hanks et al. | |

(56) References Cited

U.S. PATENT DOCUMENTS

| | | | |
|---|---|---|---|
| 2013/0080900 A1* | 3/2013 | Wilde | G06F 16/972 |
| | | | 715/736 |
| 2013/0194301 A1 | 8/2013 | Robbins et al. | |
| 2013/0268490 A1* | 10/2013 | Keebler | G06F 16/9535 |
| | | | 707/627 |
| 2013/0290443 A1 | 10/2013 | Collins et al. | |
| 2013/0332425 A1* | 12/2013 | Garg | G06Q 10/10 |
| | | | 707/687 |
| 2013/0339180 A1* | 12/2013 | LaPierre | G06Q 30/0631 |
| | | | 705/26.7 |
| 2014/0006951 A1* | 1/2014 | Hunter | H04N 21/4821 |
| | | | 715/719 |
| 2014/0032682 A1 | 1/2014 | Prado et al. | |
| 2014/0114973 A1* | 4/2014 | Wetherell | G06F 16/35 |
| | | | 707/737 |
| 2014/0122787 A1 | 5/2014 | Shalvi et al. | |
| 2014/0195516 A1* | 7/2014 | Balakrishnan | G06F 16/168 |
| | | | 707/722 |
| 2014/0201527 A1 | 7/2014 | Krivorot | |
| 2014/0282096 A1 | 9/2014 | Rubinstein et al. | |
| 2014/0324902 A1* | 10/2014 | Morris | G06F 16/338 |
| | | | 707/766 |
| 2014/0325383 A1 | 10/2014 | Brown et al. | |
| 2014/0344711 A1* | 11/2014 | Hallerstrom | H04L 51/234 |
| | | | 715/752 |
| 2014/0359024 A1 | 12/2014 | Spiegel | |
| 2014/0359032 A1 | 12/2014 | Spiegel et al. | |
| 2015/0199082 A1 | 7/2015 | Scholler et al. | |
| 2015/0227602 A1 | 8/2015 | Ramu et al. | |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0180887 A1 | 6/2016 | Sehn | |
| 2016/0226989 A1* | 8/2016 | Ovsiankin | G06F 16/24575 |
| 2016/0277419 A1 | 9/2016 | Allen et al. | |
| 2016/0286002 A1* | 9/2016 | Marra | H04L 51/16 |
| 2016/0321708 A1 | 11/2016 | Sehn | |
| 2016/0359957 A1 | 12/2016 | Laliberte | |
| 2016/0359987 A1 | 12/2016 | Laliberte | |
| 2016/0364575 A1* | 12/2016 | Caporal | G06F 16/148 |
| 2017/0161382 A1 | 6/2017 | Ouimet et al. | |
| 2017/0250943 A1* | 8/2017 | Sorg | G06Q 30/0241 |
| 2017/0255681 A1* | 9/2017 | Giunio-Zorkin | |
| | | | G06F 16/24573 |
| 2017/0263029 A1 | 9/2017 | Yan et al. | |
| 2017/0287006 A1 | 10/2017 | Azmoodeh et al. | |
| 2017/0295250 A1 | 10/2017 | Samaranayake et al. | |
| 2017/0308249 A1* | 10/2017 | Petterson | G06F 3/048 |
| 2017/0372364 A1* | 12/2017 | Andreou | G06F 3/04845 |
| 2017/0374003 A1 | 12/2017 | Allen et al. | |
| 2017/0374508 A1 | 12/2017 | Davis et al. | |
| 2018/0068019 A1* | 3/2018 | Novikoff | G06F 16/738 |
| 2018/0113860 A1* | 4/2018 | Jaskiewicz | G06F 40/55 |
| 2018/0174190 A1* | 6/2018 | Ferreira | G06Q 30/0246 |
| 2018/0198742 A1* | 7/2018 | Subramani | H04L 51/08 |
| 2018/0241705 A1* | 8/2018 | Sarafa | H04L 9/0827 |
| 2019/0279522 A1* | 9/2019 | Jafari | G09B 5/08 |
| 2021/0055835 A1* | 2/2021 | Andreou | H04N 21/41407 |
| 2021/0181911 A1* | 6/2021 | Cranfill | G06F 3/0488 |
| 2024/0272788 A1* | 8/2024 | Cranfill | G06F 3/0488 |

FOREIGN PATENT DOCUMENTS

| | | |
|---|---|---|
| WO | 2013008251 | 1/2013 |
| WO | 2014194262 | 12/2014 |
| WO | 2015192026 | 12/2015 |
| WO | 2016054562 | 4/2016 |
| WO | 2016065131 | 4/2016 |
| WO | 2016/112299 | 7/2016 |
| WO | 2016179166 | 11/2016 |
| WO | 2016179235 | 11/2016 |
| WO | 2017176739 | 10/2017 |
| WO | 2017176992 | 10/2017 |
| WO | 2018005644 | 1/2018 |

OTHER PUBLICATIONS

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", URL: http: www.theregister.co.uk Dec. 12, 2005 stealthtext , (Dec. 12, 2005), 1 pg.

Melanson, Mike, "This text message will self destruct in 60 seconds", URL: http: readwrite.com Feb. 11, 2011 this_text_message_will_self_destruct_in_60_seconds, (Feb. 18, 2015), 4 pgs.

Sawers, Paul, "Snapchat for iOS Lets You Send Photos to Friends and Set How long They're Visible For", URL: https: thenextweb.com apps May 7, 2012 snapchat-for-ios-lets-you-send-photos-to-friends-and-set-how-long-theyre-visible-for , Jan. 1, 2012, (May 7, 2012).

Shein, Esther, "Ephemeral Data", Communications of the ACM, vol. 56, No. 9, (Sep. 2013), 20-22.

Vaas, Lisa, "StealthText, Should You Choose to Accept It", URL: http: www.eweek.com print c a MessagingandCollaboration StealthTextShouldYouChoosetoAcceptIt, (Dec. 13, 2005), 2 pgs.

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/> (Oct. 3, 2013), 2 pgs.

Etherington, Darrell, "Snapchat Gets Its Own Timeline With Snapchat Stories, 24-Hour Photo and Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear> (Oct. 3, 2013), 5 pgs.

* cited by examiner

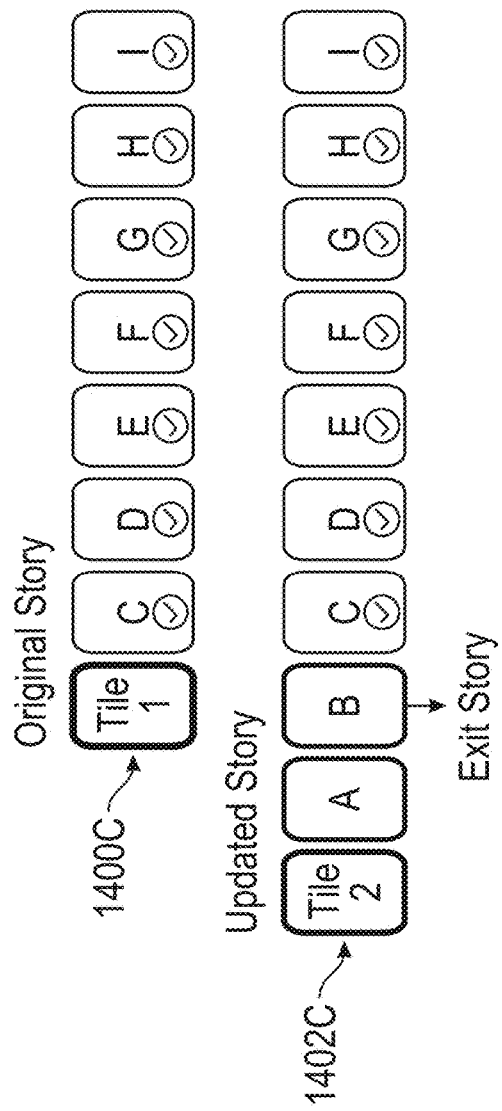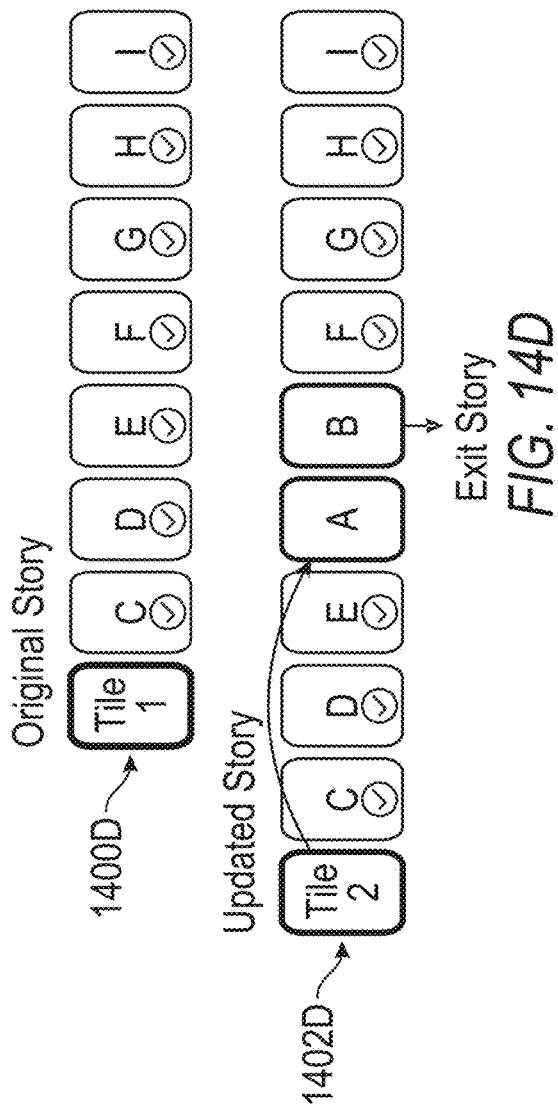

MANAGEMENT OF ELECTRONICALLY PUBLISHED COLLECTIONS OF CONTENT

PRIORITY CLAIM

This application claims the benefit of priority to U.S. Provisional Patent Application Ser. No. 62/473,735, filed on Mar. 20, 2017, titled "MANAGEMENT OF ELECTRONICALLY PUBLISHED COLLECTIONS OF CONTENT," which is herein incorporated by reference in its entirety.

TECHNICAL FIELD

The present disclosure generally relates to the technical field of special-purpose machines configured to manage electronically published collections of content including computerized variants of such special-purpose machines and improvements to such variants, and to the technologies by which such special-purpose machines become improved compared to other special-purpose machines that manage electronically published collections of content.

BACKGROUND

Telecommunications applications and devices can provide communication between multiple users using a variety of media, such as text, images, sound recordings, and/or video recordings. These applications may present items of communication data representing collections of content published by a user to be viewed by other users. Collections of content presented in these telecommunications applications are typically static in presentation and organization, and may be replaced only at routine intervals. As a result, the content included in such collections is unlikely to be current, and when new content items are actually added to a collection of content items, they will likely go unseen by other users. Accordingly, there is still a need in the art to improve presentation and organization of communication data between devices and accessibility of operations on communications devices.

BRIEF DESCRIPTION OF THE DRAWINGS

To easily identify the discussion of any particular element or act, the most significant digit or digits in a reference number refer to the figure number in which that element is first introduced.

FIGS. 14A-D are diagrams illustrating changes to a published collection of content as a result of modifications by a publisher, according to example embodiments.

DETAILED DESCRIPTION

Description

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products for managing electronically published content collections. A content collection includes content items such as images, video, text, and combinations thereof. A content collection may be organized into a "story" and the content items within the story may be presented in an ordered sequence. Conventionally, a publisher prepares stories at periodic intervals (e.g., daily), which are then published at the same periodic interval (e.g., daily). Once a story is published, it remains static until the next story is published in its place. As a result, stories may include content that is not current, and thus publishers of such stories may quickly lose their appeal to other users.

To address the forgoing issues with periodic publication, the system provides publishers with functionality to allow for continuous editing and publication of stories. For example, the system includes functionality that allows publishers to add, remove, reorganize, or reorder content items in a story at any time. In this manner, publishers are able to improve the recency, relevance, and appeal of the stories they publish. Additionally, the system may maintain a read state for each story and may modify a story's read state when changes are made to increase the likelihood that any new content items are surfaced to users even if the users have already viewed the story or portions of the story. Further, each story may have an associated tile (e.g., an image thumbnail) that indicates an existence of the story and provides an access point to the story via user selection. The system may update a story's tile each time a new content item is added or the read state of the story changes to further increase the likelihood that users will view updated stories.

DRAWINGS

Figure 1:
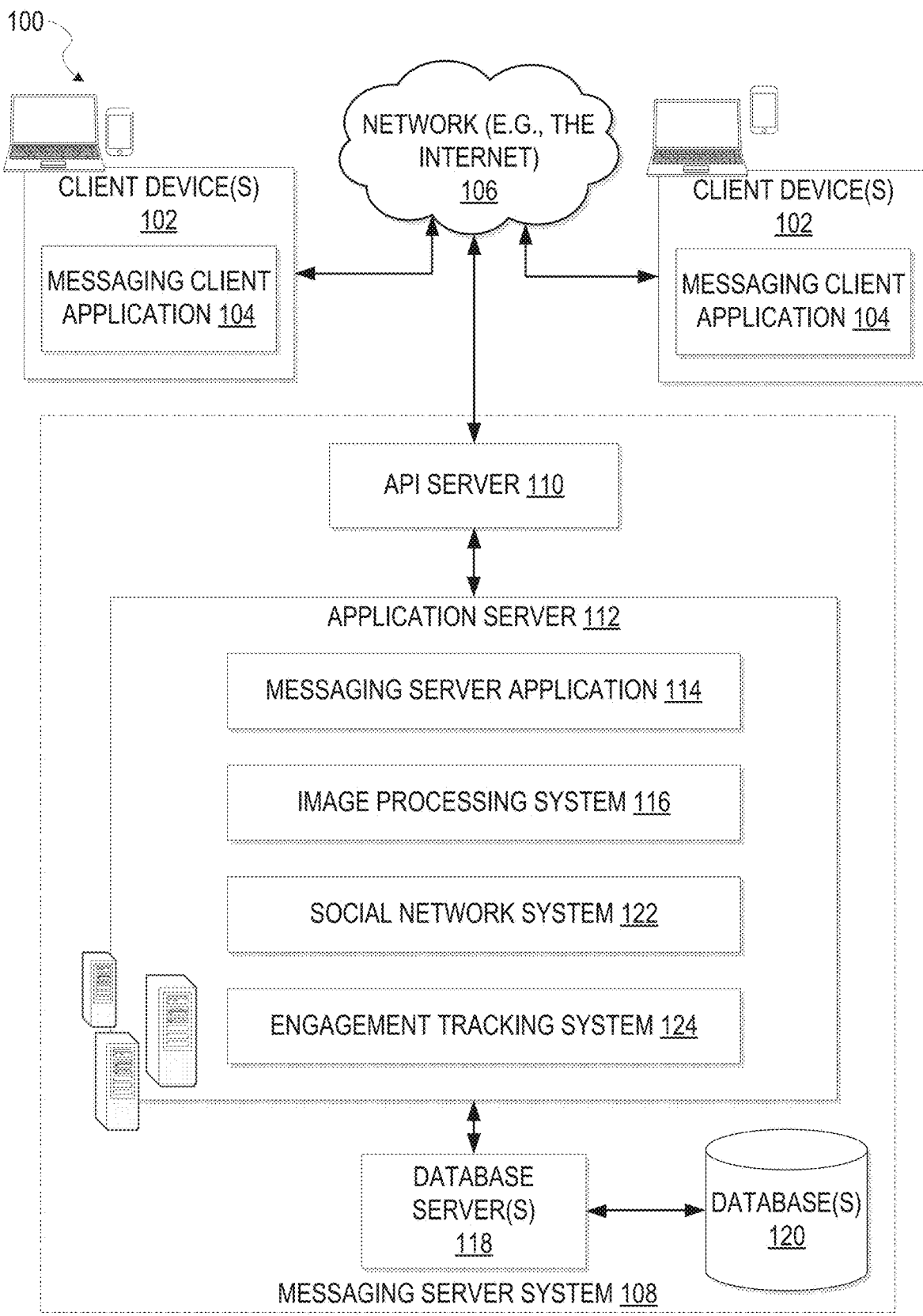
FIG. 1 is a block diagram showing an example messaging system for exchanging data (e.g., messages and associated content) over a network, according to example embodiments.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114, for possible access by another messaging client application 104; the setting of a collection of media data (e.g., story); the retrieval of such collections; the retrieval of a list of friends of a user of a client device 102; the retrieval of messages and content; the adding of friends to and deletion of friends from a social graph; the location of friends within a social graph; and opening an application event (e.g., relating to the messaging client application 104).

The application server 112 hosts a number of applications and subsystems, including a messaging server application 114, an image processing system 116, a social network system 122, and an engagement tracking system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph 304 (described below with reference to FIG. 3) within the database 120. Examples of functions and services supported by the social network system 122 include the identification of other users of the messaging system 100 with whom a particular user has relationships or whom the particular user is "following," and also the identification of other entities and interests of a particular user.

The engagement tracking system 124 provides functionality to monitor and calculate a user engagement score of media items distributed by the messaging server application 114 based on tracked user interactions with the media items.

Figure 2:
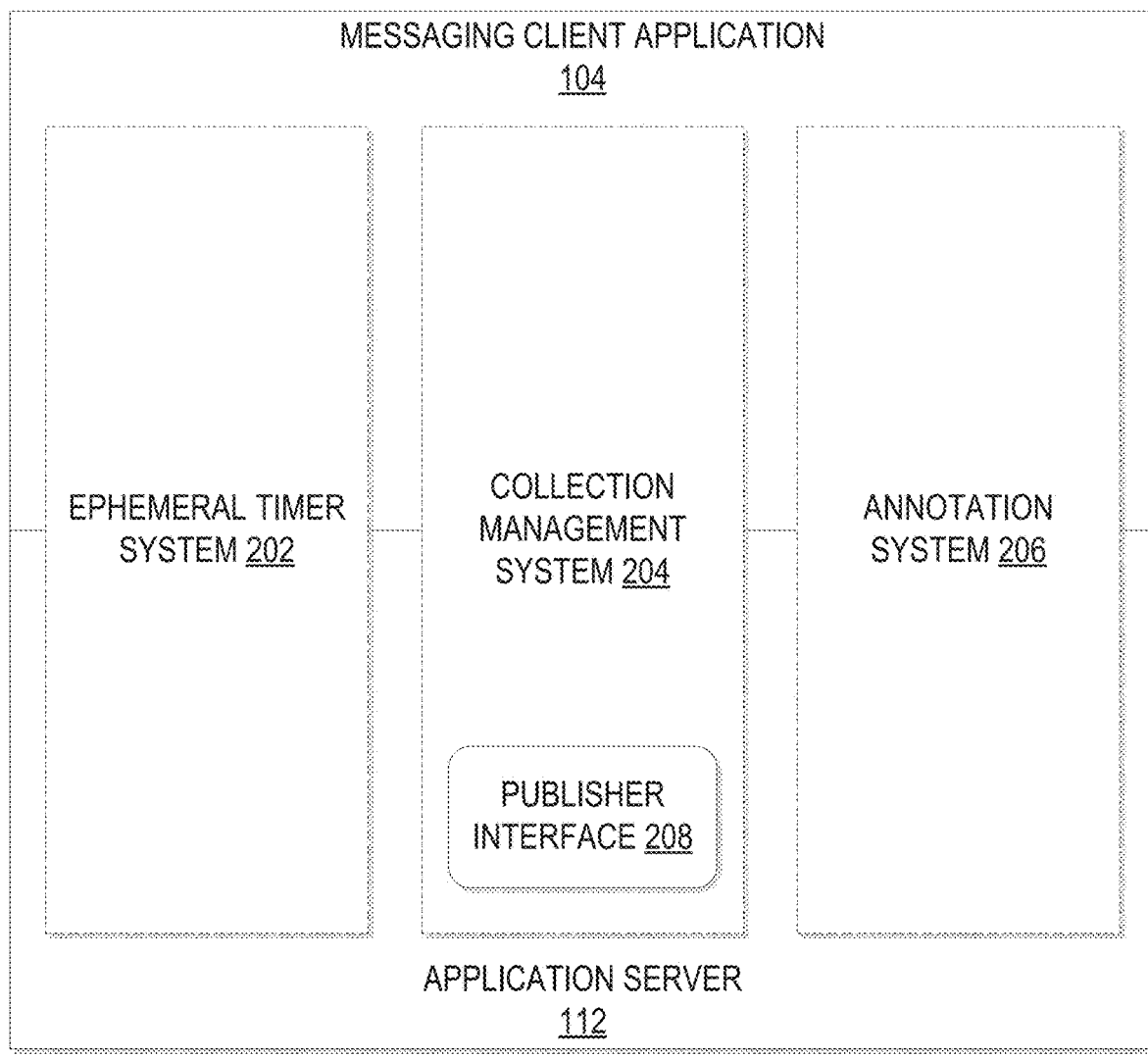
FIG. 2 is a block diagram illustrating further details regarding the messaging system, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). The collection management system 204 furthermore includes a publisher interface 208 that allows a publisher to create, edit, curate, and otherwise manage a particular collection of content. A publisher is a user or entity that owns and creates content collections (e.g., stories), and each publisher may have multiple publishing users.

In some examples, a collection of content items (e.g., messages, including images, video, text, and audio) may be organized into a "story." Content items included in a story may be ordered in a particular sequence. Users may access stories via the messaging client application 104 executing on the client device 102. A user viewing a particular story using the messaging client application 104 is presented with a single content item at a time and may navigate through the sequence of content items in the story by providing appropriate input to the client device 102, such as a tap gesture on a touch display of the client device 102. By default, upon selection of a story, the first content item in the sequence presented to the user, which is referred to hereinafter as the "read point," is the first unread (e.g., not viewed) content item in the sequence, although this may vary, in some embodiments, based on user preferences.

The ordering of content items in content collections such as stories may be based on ordering specified by a publishing user or determined algorithmically by the collection management system 204. For example, content published by the messaging system 100 may be tagged according to a category or topic of the content. Further, the messaging system 100 may develop user preference profiles for each of its users based on the users' interaction with the content published by the messaging system 100 and the tags associated with such content. In this way, the messaging system 100 may track and maintain records of users' preferences for certain categories or topics of content. In determining an ordering of content items within a content collection, the collection management system 204 may leverage the information about user preferences by weighting each content item according to the user preferences (e.g., content belonging to a topic or category for which a user has demonstrated an affinity is weighted higher than content belonging to a topic or category for which a user has not demonstrated an affinity) and determining the order of content items in the content collection based on respective weightings of the content items.

In addition, the collection management system 204 may utilize techniques similar to those described above to automatically add content items to or remove content items from a content collection. Content items added to a content collection may be retrieved from an archive library of the publisher of the content collection. Content items removed from a content collection may be added to the archive library of the publisher of the content collection. The decision to add or remove content items to or from a content collection may based on an individual user's preferences or based on global trends represented by preferences of a group of users. For example, a content item may be removed from a content collection in response to determining that a user engagement score (e.g., determined by the engagement tracking system 124 based on views and interactions) with the content item is below a threshold user engagement score.

A collection of content items organized as a story may be further organized into content sections within the story. A content section is a granular grouping of content items within a story. The grouping may be specified by a publishing user and may, for example, be based on a relationship between the content items in the grouping, such as a similarity of category or topic. The grouping of content items into sections may impact the manner in which a user may navigate through a story. For example, in addition to being able to skip a single content item in the sequence of content items included in the story, users may skip entire sections.

The collection management system 204 may also be responsible for publishing a tile (e.g., an image thumbnail) that provides notification of the existence of a story to the user interface of the messaging client application 104. A user of the messaging client application 104 may select the tile to access the corresponding story. The tile may include a content item, which may be selected by the collection management system 204 from among a plurality of content items designated as tiles for a particular story. The collection management system 204 may select a content item as the tile for a story based on, for example, publishing user preferences, a read state of the story (e.g., "Read," "Partially Read," or "Unread"), a read point of the story (e.g., the first content item in the sequence presented to the user upon selecting the tile), a relationship of the content item with one or more content items included in the story, or various combinations thereof. Additionally, each tile may include a visual indicator of a read state of the story, such as a symbol, a colored border, or shading. The read state of a story is based on individual read states of content items included in the story. The read state of a content item indicates whether a user has read (e.g., viewed) the content item, and thus, the read state of an individual content item is either "Read" or "Unread." Given that multiple content items may be included in a story, the read state of the story indicates not only whether a user has read the content items included in the story, but whether the user may have read only a portion of the content items of the story. Accordingly, the read states of a story may be "Read" if the user has read all content items in the story; "Partially Read" if the user has read a portion of content items in the story but has not yet read the remainder; and "Unread" if the user has not read any of the content items in the story.

A story may be made available for a specified time period, such as the duration of an event to which the content relates. For example, content relating to a music concert may be made available as a "story" for the duration of that music concert. The time period for which the collection is available may be specified by a publishing user. For example, a publishing user may specify a scheduled time to publish a story or an edit to a story (e.g., a new content item), a scheduled time to remove a story or content item from publication, or an expiration time period at which a story or content item is to be removed from publication.

The publisher interface 208 may be organized into multiple panels, each of which provides separate functionality and may be accessed through selection of a corresponding tab (e.g., a selectable user interface control element). In an example, the publisher interface 208 includes: (1) a "drafts" panel for editing content collections; (2) a "current" panel that provides access to a publishing queue for confirming and publishing content collection edits; and (3) an "archive" panel for archiving content items from content collections. In some embodiments, the publisher interface 208 may further include a "scheduled" panel that allows publishing users to view content items scheduled for publication and edit temporal constraints that dictate the publication schedules. Further details regarding the publisher interface 208 are discussed below in reference to FIGS. 6-13.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location overlay (e.g., Venice Beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
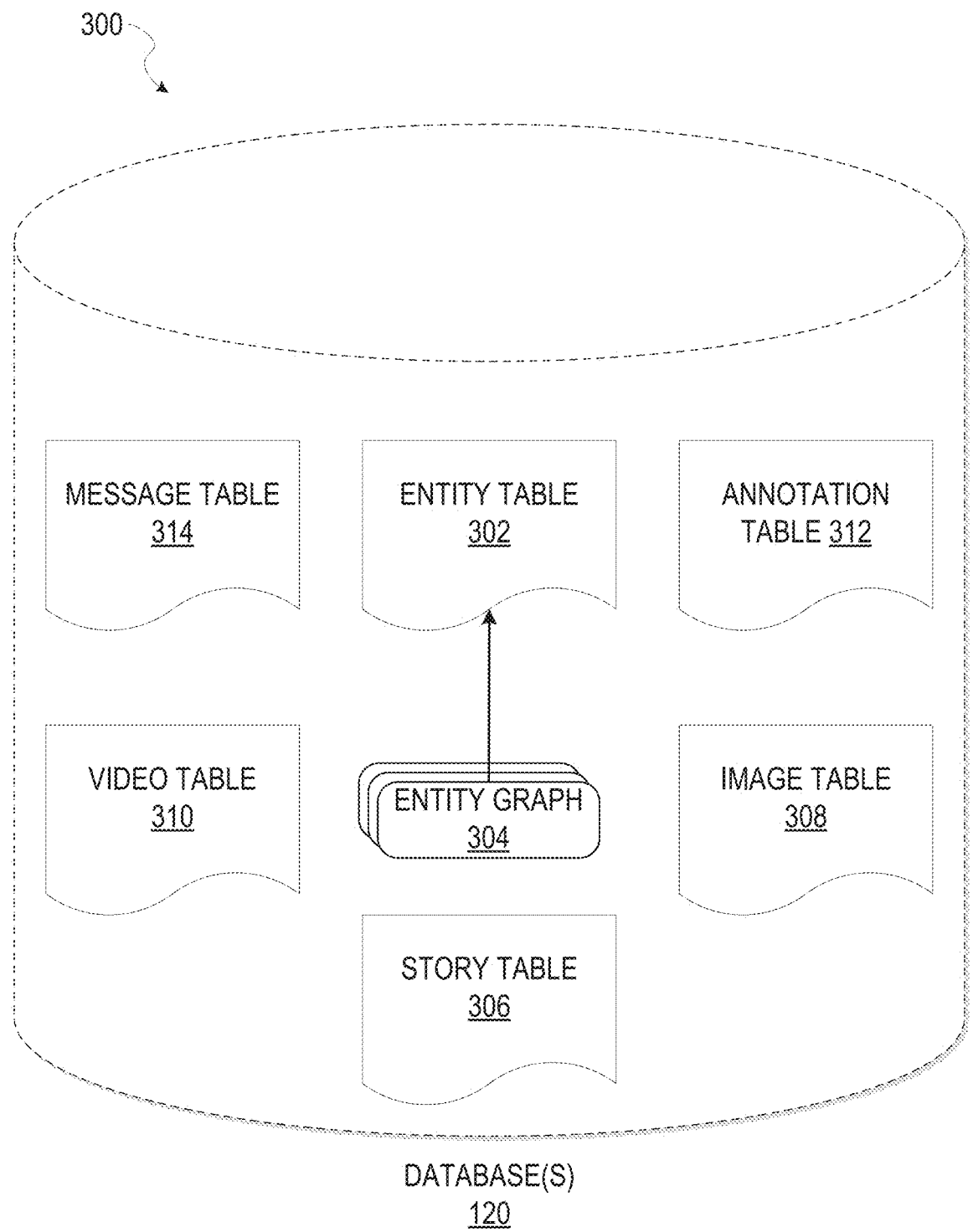
FIG. 3 is a schematic diagram illustrating data which may be stored in a database of a messaging server system, according to example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common event location at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
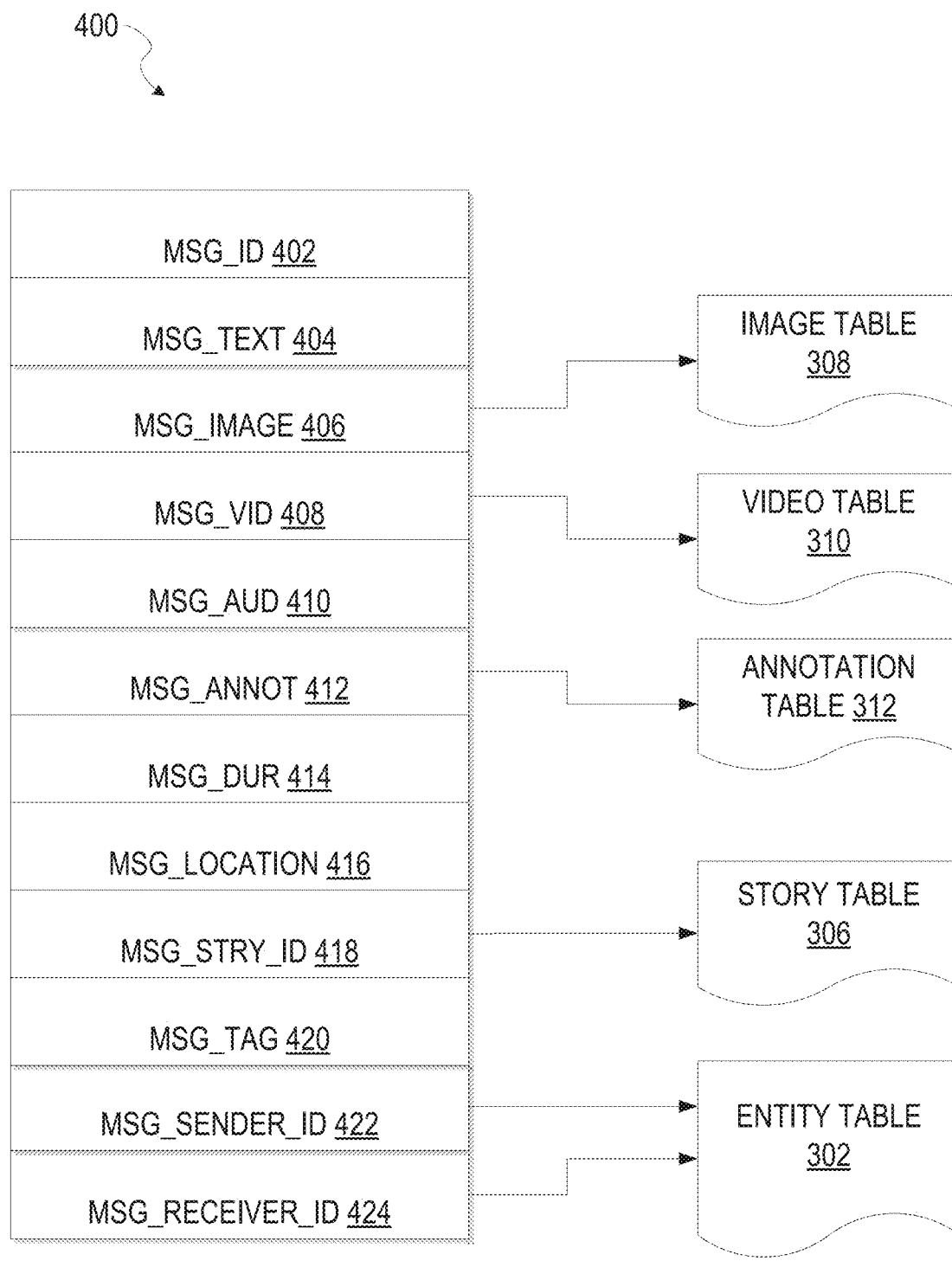
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of the client device 102 or retrieved from memory of the client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from the memory component of the client device 102, and that is included in the message 400.
- Message annotations 412: annotation data (e.g., filters, stickers, or other enhancements) that represents annotations to be applied to the message image payload 406, message video payload 408, or message audio payload 410 of the message 400.
- A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.
- A message geolocation parameter 416: geolocation data (e.g., latitudinal and longitudinal coordinates) associated with the content payload of the message 400. Multiple message geolocation parameter 416 values may be included in the payload, each of these parameter values being associated with content items included in the content (e.g., a specific image within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent,
- A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
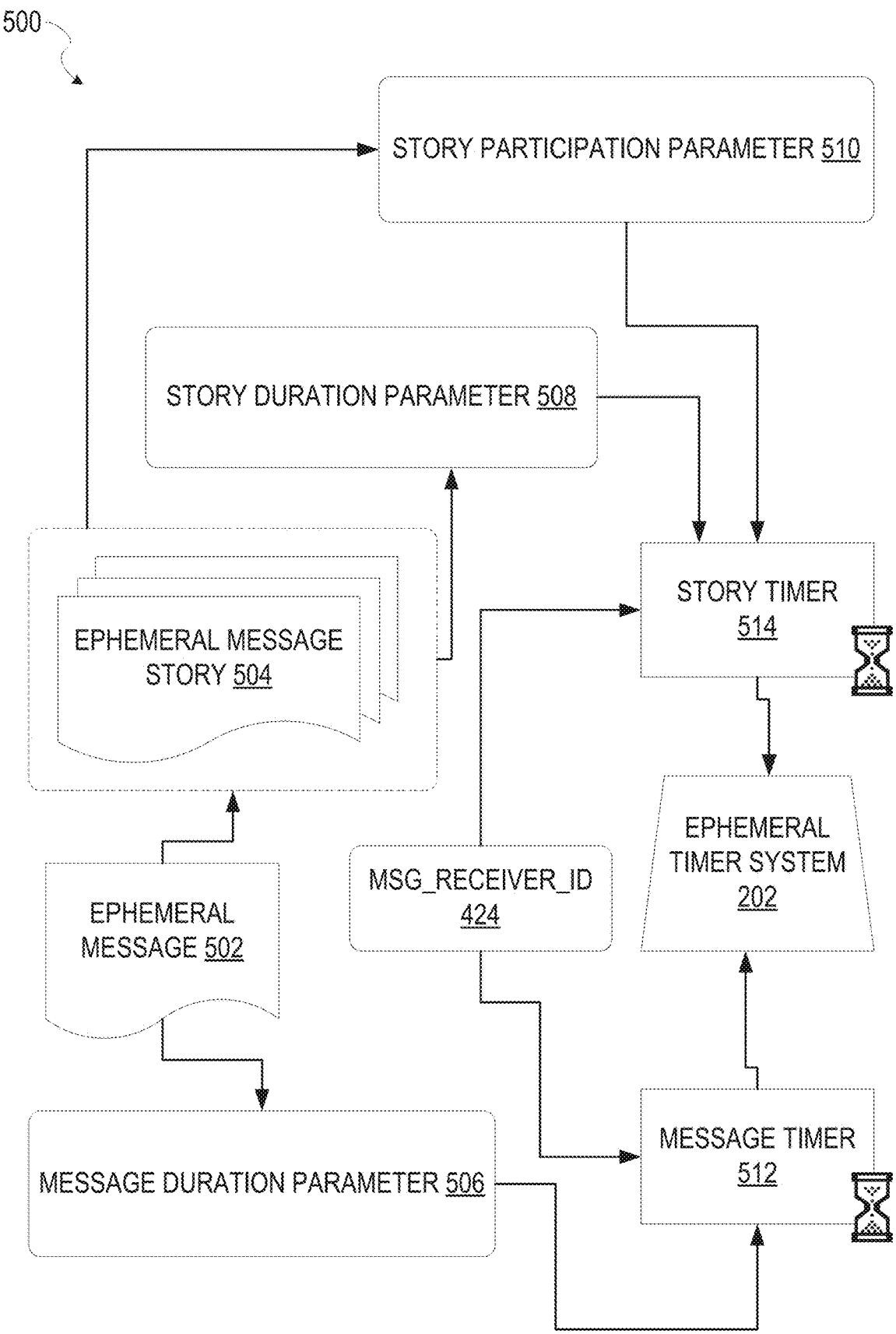
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to example embodiments.
Figure 6:
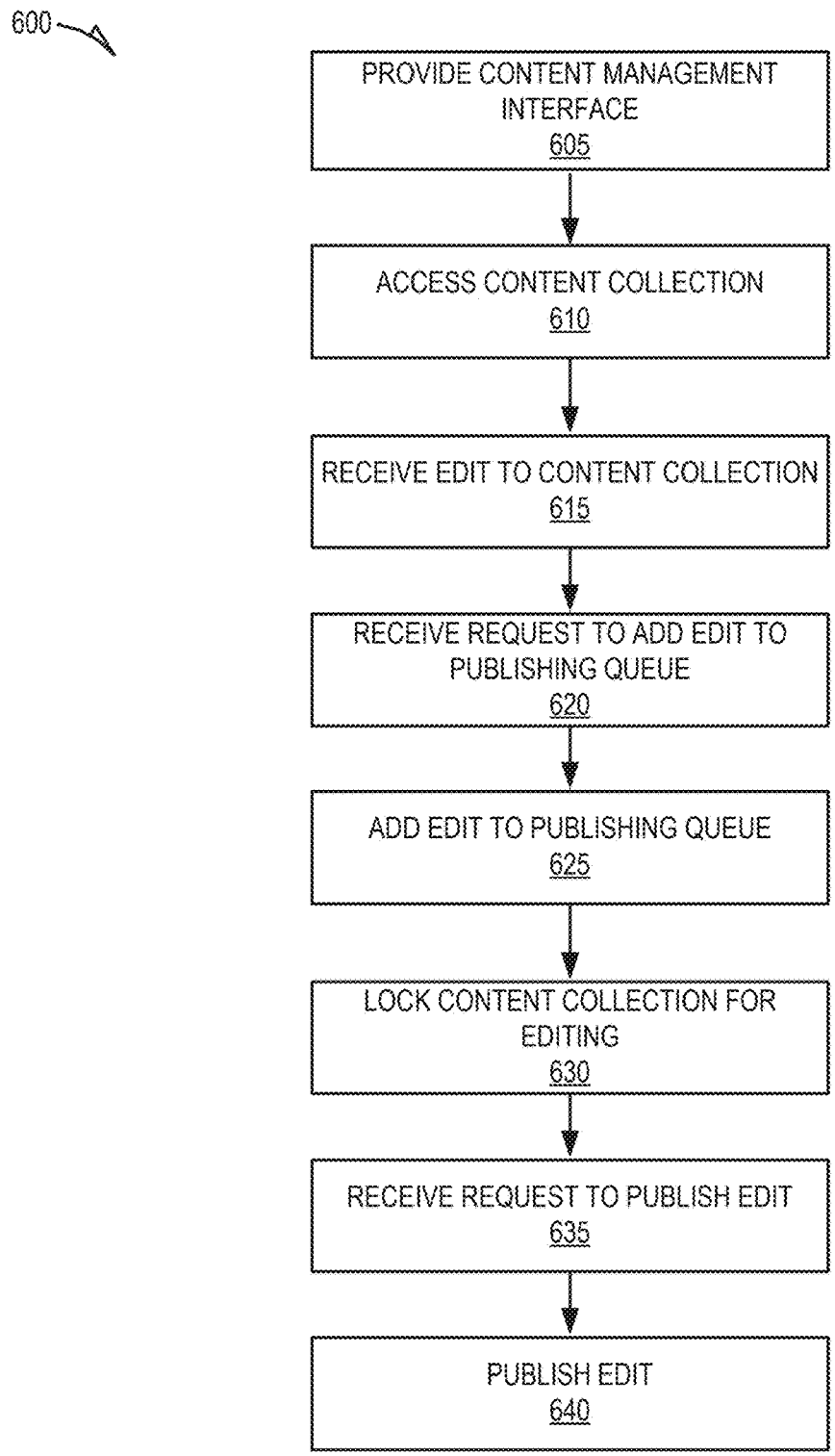
FIGS. 6-9 are flowcharts illustrating operations of a collection management system, which is provided as part of the messaging system, in performing a method for facilitating management of a content collection, according to example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of the ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

FIGS. 6-9 are flowcharts illustrating operations of the collection management system 204, which is provided as part of the messaging system 100, in performing a method 600 for facilitating management of a content collection, according to some embodiments. The method 600 may be embodied in computer-readable instructions for execution by one or more processors such that the operations of the method 600 may be performed in part or in whole by the functional components of the collection management system 204; accordingly, the method 600 is described below by way of example with reference thereto. However, it shall be appreciated that at least some of the operations of the method 600 may be deployed on various other hardware configurations than the collection management system 204.

At operation 605, the collection management system 204 provides the publisher interface 208 to the client device 102. To provide the publisher interface 208, the collection management system 204 transmits a set of machine-readable instructions to the client device 102 that causes the client device 102 to present the publisher interface 208 on a display of the client device 102. The set of machine-readable instructions may, for example, include presentation data (e.g., representing the publisher interface 208), and a set of instructions to display the presentation data.

As noted above, the publisher interface 208 may be organized into multiple panels, each of which provides separate functionality and may be accessed through selection of a corresponding tab (e.g., a selectable user interface control element). In an example, the publisher interface 208 includes: (1) a "drafts" panel configured for editing content collections; (2) a "current" panel that provides access to a publishing queue and that is configured for confirming and publishing content collection edits; and (3) an "archive" panel configured for archiving content items from content collections.

At operation 610, the collection management system 204 accesses a content collection (e.g., a story). The content collection includes one or more content items ordered in a particular sequence.

At operation 615, the collection management system 204 receives an edit to the content collection. The edit may be submitted by the publishing user of the client device 102 using one or more graphical control elements included in the drafts panel of the publisher interface 208. The edit may include an update to the content collection, such as adding or removing one or more content items to or from the content collection, adding or removing one or more sections to or from the content collection, modifying one or more content items included in the content collection, modifying one or more sections of the content collection, changing an ordering of the content items in the content collection, or defining one or more sections in the content collection.

At operation 620, the collection management system 204 receives a request to add the edit to the content collection to the publishing queue. The request may be generated in response to user selection of a selectable element (e.g., a button) included in the publisher interface 208. At operation 625, the collection management system 204 adds the edit to the content collection to the publishing queue in response to receiving the request. In some embodiments, the collection management system 204 maintains a counter of pending (e.g., unpublished) edits to the content collection, and in adding the edit to the publishing queue, the collection management system 204 may increment the counter. The counter may be displayed within the publisher interface 208, such as at or near the tab used to access the current panel.

As noted above, the publishing queue may be accessed from the current panel of the publisher interface 208. The current panel of the publisher interface 208 may include one or more graphical control elements (e.g., buttons) that allow a publishing user of the client device 102 to publish pending (e.g., unpublished) edits to the content collection included in the publishing queue. The current panel may further provide functionality (e.g., in the form of graphical control elements such as buttons and sliders) that allows users to reorder content items in the content collection. The current panel may additionally include graphical control elements that allow the user to archive content items from the content collection, which may then be viewed within the archive panel of the publisher interface 208.

At operation 630, the collection management system 204 locks the content collection for editing in response to adding the edit to the publishing queue. In locking the content collection for editing, the collection management system 204 prevents all other publishing users from adding edits to the content collection to the publishing queue. In other words, though there may be multiple publishing users who have the requisite permissions to edit the content collection, only the publishing user of the client device 102 from which the request to edit was received at operation 620 may add edits to the publishing queue.

At operation 635, the collection management system 204 receives a request to publish the edit to the content collection. The request may be generated in response to user selection of one of the above-mentioned graphical control elements included in the current tab of the publisher interface 208. In some embodiments, the request to publish may include one or more temporal constraints on the publishing of the edit to the content collection. For example, the temporal constraints may include a scheduled time for publishing the edit, a scheduled time for removing the edit from publication, or an expiration time for keeping the edit in the published content collection.

At operation 640, the collection management system 204 publishes the edit to the content collection. In publishing the edit to the content collection, the collection management system 204 makes the edit to the content collection viewable by users of the messaging system 100 who are, in some cases, subscribers to content published by the publisher of the content collection. In instances in which the edit has associated temporal constraints on the publishing of the edit, the collection management system 204 publishes the edit to the content collection in accordance with the temporal constraints. For example, the collection management system 204 may delay publishing the edit until a scheduled time for publishing the edit. Additionally, the collection management system 204 may unlock the content collection for editing by other publishing users in response to publishing the edit to the content collection. Further, the collection management system 204 may decrement the counter of pending edits based on the publishing of the edit to the content collection.

Figure 7:
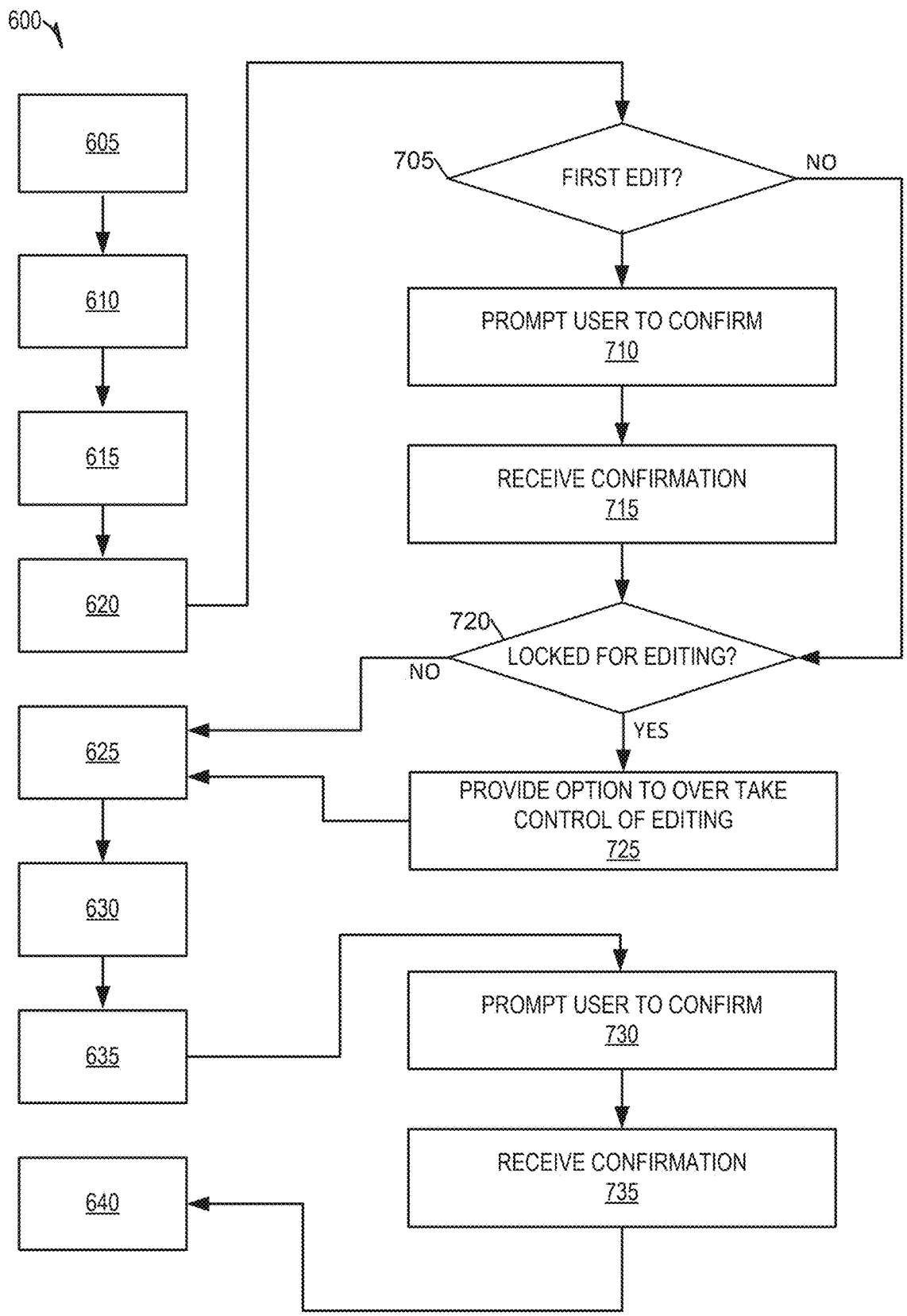

As shown in FIG. 7, the method 600 may, in some embodiments, also include operations 705, 710, 715, 720, 725, 730, and 735. The operations 705, 710, 715, 720, and 725 may be performed subsequent to operation 620, at which the collection management system 204 receives a request to add the edit to the content collection to the publishing queue accessed within the current panel of the publisher interface 208. At operation 705, the collection management system 204 determines whether the edit to the content collection is the first edit by the publishing user during the session. If, at operation 705, the collection management system 204 determines that the edit to the content collection is not the first edit by the publishing user during the session, the method 600 proceeds to operation 720, which is described below.

If, at operation 705, the collection management system 204 determines that the edit to the content collection is the first edit to the content collection by the publishing user during the session, the method 600 proceeds to operation 710, where the collection management system 204 prompts the publishing user to confirm the request to add the edit to the content collection to the publishing queue. In prompting the publishing user, the collection management system 204 may cause the client device 102 to present a modal (e.g., a pop-up window) with a message requesting the user to confirm the request to add the edit to the content collection to the publishing queue. At operation 715, the collection management system 204 receives confirmation from the publishing user to add the edit to the content collection to the publishing queue. The confirmation may be provided through selection of a selectable element (e.g., a button) presented within the modal.

At operation 720, the collection management system 204 determines whether the content collection is locked for editing by another publishing user. If, at operation 720, the collection management system 204 determines that the content collection is not locked for editing by another publishing user, the method 600 proceeds to operation 625, where the collection management system 204 adds the edit to the content collection to the publishing queue.

If, at operation 720, the collection management system 204 determines that the content collection is locked for editing by another publishing user, the collection management system 204, at operation 725, provides the publishing user with the option to take over control of editing the content collection from the other publishing user. In providing the publishing user the option to take over control of the editing of the content collection, the collection management system 204 may cause the client device 102 to present a modal (e.g., a pop-up window) with a message asking the publishing user to confirm whether the publishing user wishes to take over control of the editing from the other publishing user. Upon the collection management system 204 receiving confirmation from the publishing user to take over control of editing the content collection from the other publishing user (e.g., through selection of a selectable element included in the modal), the method 600 proceeds to operation 625, where the collection management system 204 adds the edit to the content collection to the publishing queue. If the publishing user does not provide confirmation, the method 600 ends and the edit to the content collection is not added to the publishing queue.

As shown, the operations 730 and 735 may be performed subsequent to operation 635, at which the collection management system 204 receives a request to publish the edit to the content collection. At operation 730, the collection management system 204 prompts the publishing user to confirm the request to publish the edit to the content collection. In prompting the publishing user, the collection management system 204 may cause the client device 102 to present a modal (e.g., a pop-up window) with a message requesting the user to confirm the request to publish the edit to the content collection. At operation 735, the collection management system 204 receives confirmation from the publishing user to publish the edit to the content collection. The confirmation may be provided through selection of a selectable element (e.g., a button) presented within the modal.

Figure 8:
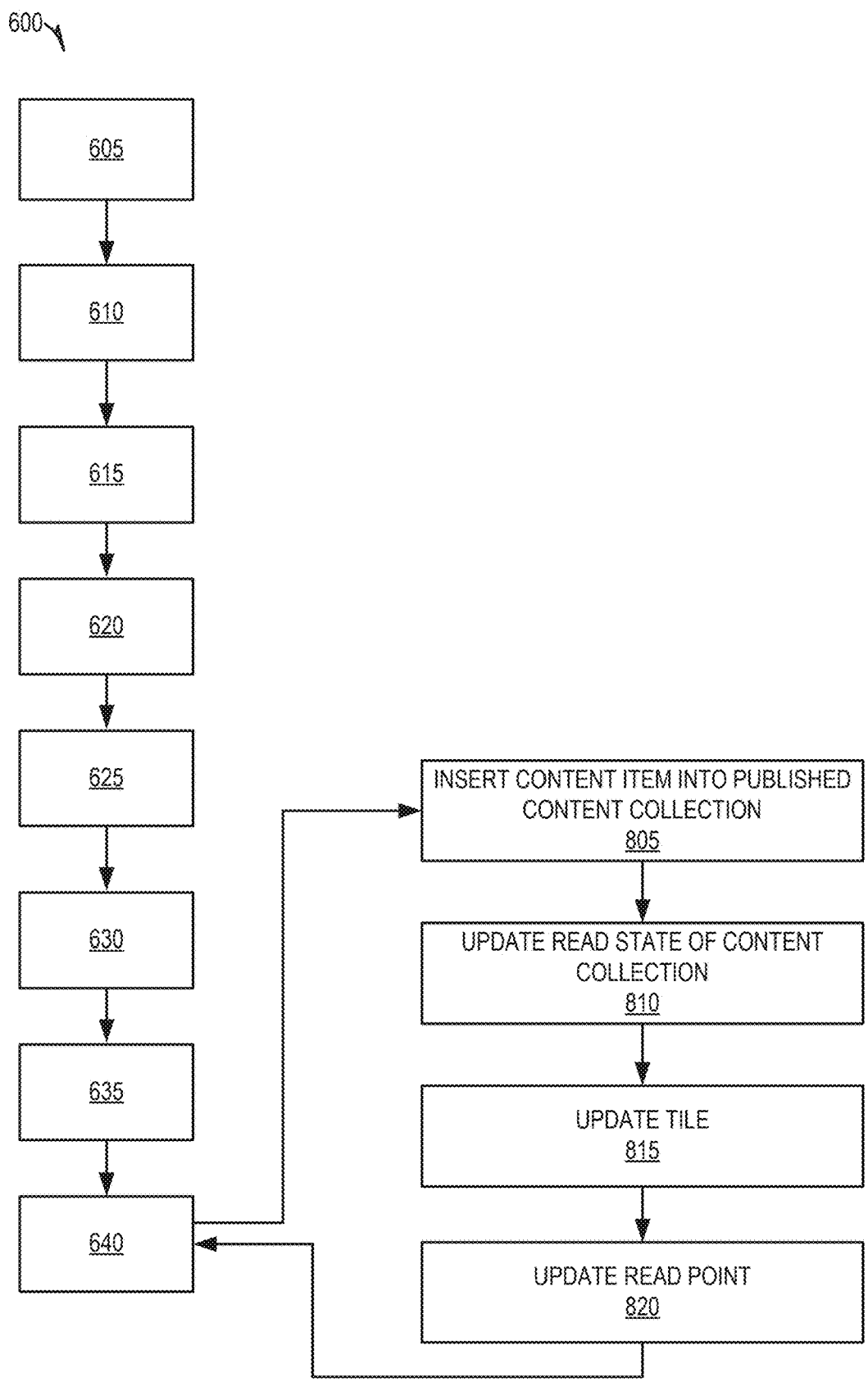

As shown in FIG. 8, the method 600 may, in some embodiments, further include operations 805, 810, 815, and 820. The operations 805, 810, 815, and 820 may be performed as part (e.g., precursor tasks or subroutines) of operation 640, at which the collection management system 204 publishes the edit to the content collection. Although the operation 640 is described above as including publishing the edit such that multiple users may view the edit, the operations 805, 810, 815, and 820 are described below in reference to a single user, specifically the client device 102 of a single user. Additionally, in the context of operations 805, 810, 815, and 820, the edit to the content collection includes an addition of one or more new content items into the content collection.

At operation 805, the collection management system 204 inserts the one or more new content items into the published content collection. In some embodiments, the one or more new content items are inserted into the published content collection at a position based on an ordering specified by the publishing user. As described above, in some other embodiments, the one or more new content items are inserted into the published content collection at a position based on an ordering algorithmically determined by the collection management system 204.

At operation 810, the collection management system 204 may, in some instances, update a read state of the published content collection based on the insertion of the one or more content items into the published content collection. As noted above, each content collection has a read state based on individual read states of content items included therein. The read states include "Read" if the read state of each content item in the content collection is "Read," "Partially Read" if only a portion of the content items have a read state of "Read," and "Unread" if the read state of each content item in the content collection is "Unread." Thus, assuming that the read state of the content collection was "Read" prior to inclusion of the one or more new content items, the collection management system 204 updates the read state to "Partially Read" based on the inclusion of the one or more new content items. In instances in which the read state of the content collection is either "Unread" or "Partially Read," the collection management system 204 need not update the read state of the content collection.

At operation 815, the collection management system 204 updates a tile corresponding to the content collection. As noted above, a tile may be presented within the user interface of the messaging client application 104 to provide notification of the existence of the content collection, and users may select the tile to access the corresponding content collection. The tile may include a content item (e.g., a thumbnail image), which, in some instances, may provide an indication of the content of the content collection. The tile may be a content item selected from among a plurality of content items designated by the publisher as possible tiles for the content collection. Accordingly, in some instances, the updating of the tile may include selecting an alternative content item as the tile based on the one or more new content items added to the content collection, and replacing the content item of the current tile with the alternative content item. Further, the tile may include one or more state indicators (e.g., a visual symbol, colored border, or shading) to indicate a read state of the content collection (e.g., a check mark to indicate that the read state of the content collection is "Read"). Accordingly, in some instances, the updating of the tile may include updating a state indicator included in the tile based on the update to the read state of the content collection performed at operation 810.

At operation 820, the collection management system 204 may, in some instances, update a read point of the content collection for the user based on the insertion of the one or more new content items into the content collection. The read point refers to a content item in the content collection that the user is presented upon selecting the tile corresponding to the content collection. By default, the read point is the first content item in the sequence that has an "Unread" read state.

In instances in which the read state of the content collection is "Unread," the collection management system 204 updates the read point of the content collection to be the one or more new content items, if the one or more new content items are added to the beginning of the content collection. Otherwise, the read point remains the same.

In instances in which the read state of the content collection is "Partially Read," the collection management system 204 updates the read point of the content collection to be the one or more new content items, if the one or more new content items are added to the beginning of the content collection. Otherwise, the read point is the first content item in the sequence that has an "Unread" read state (e.g., the default).

In instances in which the read state of the content collection is "Read," the collection management system 204 updates the read point of the content collection to be the one or more new content items, regardless of their order in the content collection.

Figure 9:
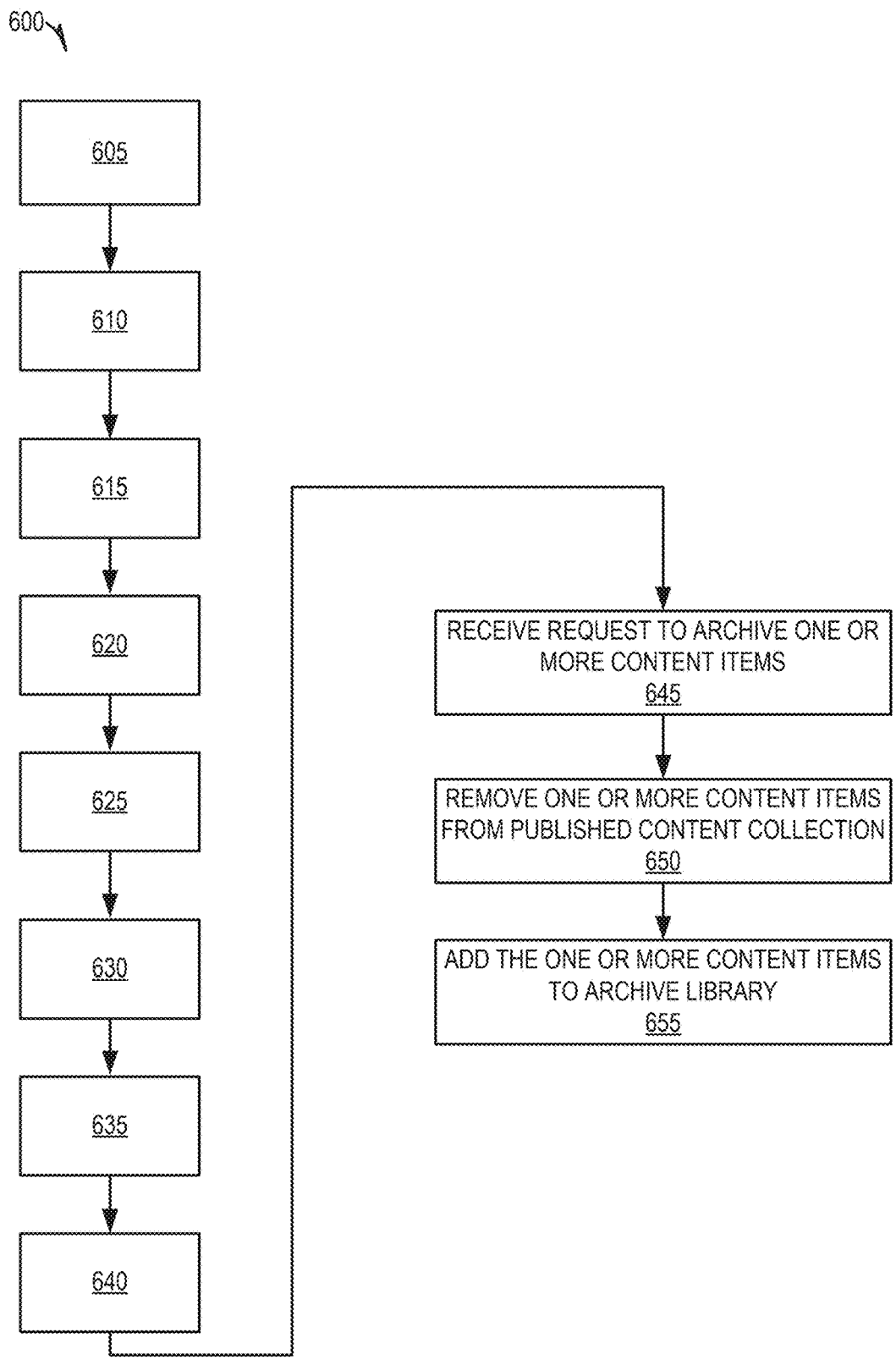

As shown in FIG. 9, the method 600 may further include operations 645, 650, and 655. At operation 645, the collection management system 204 receives a request to archive one or more content items from the content collection. The request may be generated in response to user selection of a selectable element (e.g., a button) included in the current panel of the publisher interface 208.

At operation 650, the collection management system 204 removes the one or more content items from the published content collection in response to receiving the request. By being removed from the published content collection, the one or more content items become unpublished such that they may no longer be viewed by users of the messaging system 100.

At operation 655, the collection management system 204 adds the one or more content items to the archive library. The publishing users may view the archive library through selection of the tab corresponding to the archive panel of the publisher interface 208. In adding the one or more content items to the archive library, the collection management system 204 may persist the one or more content items to a data store (e.g., a machine-readable medium) of the messaging system 100 (e.g., the database(s) 120).

Figure 10:
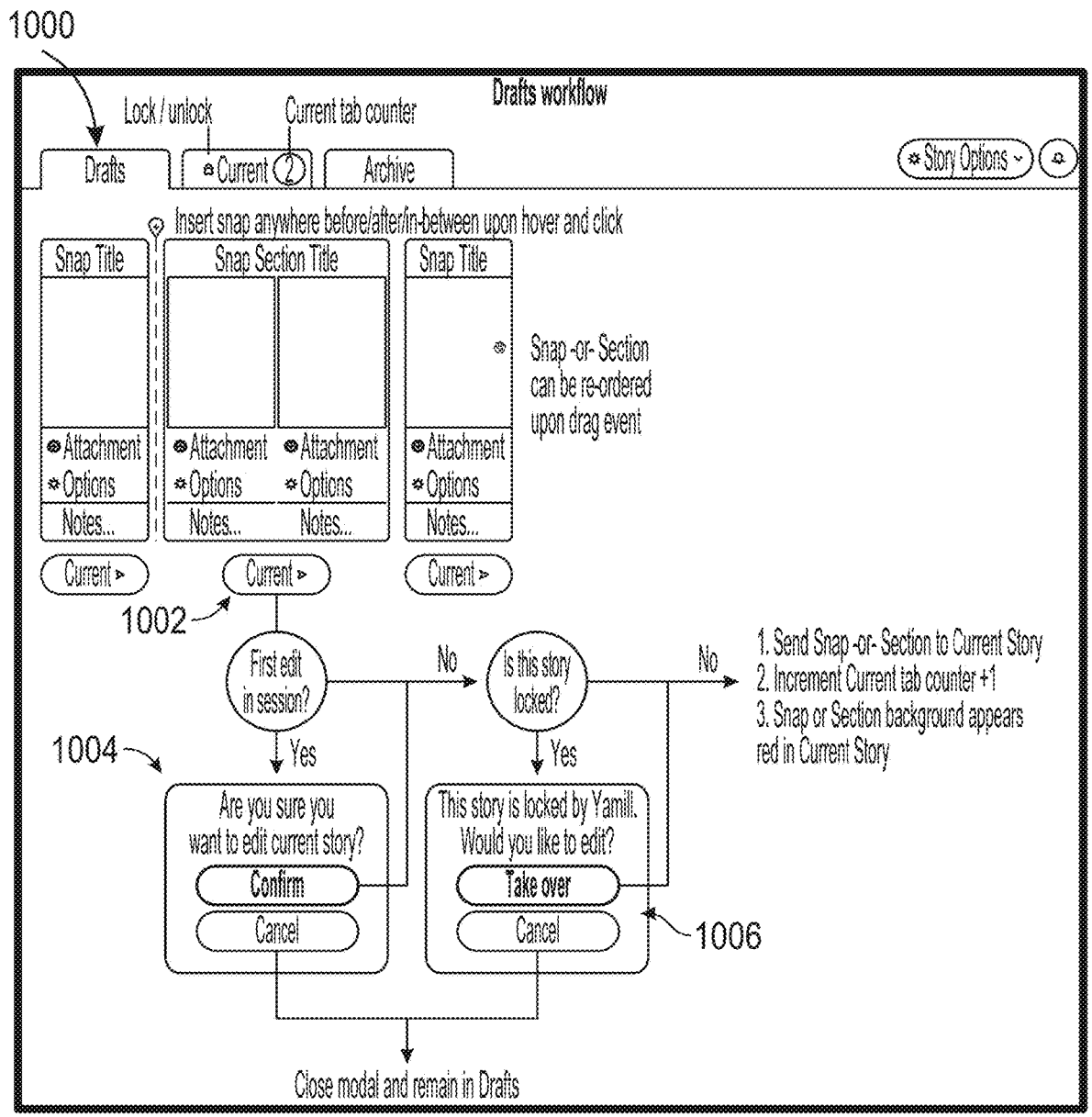
FIGS. 10-13 are flowcharts illustrating various workflows involved in facilitating management of the content collection, according to some embodiments.

FIG. 10 illustrates a graphical representation of a work flow related to user interaction with a drafts panel 1000 of the publisher interface 208, according to some example embodiments. As shown, a publishing user may select a button 1002 to request to add a new content item to the publishing queue. In response to user selection of the button 1002, the collection management system 204 determines whether the edit (i.e., the adding the new content item) to the content collection is the first edit by the publishing user during the session (e.g., operation 705). If the collection management system 204 determines that the edit to the content collection is the first edit to the content collection of the session, the collection management system 204 causes display of a modal 1004 in the publisher interface 208 (e.g., operation 710), which prompts the publishing user to confirm the request to add the edit to the content collection to the publishing queue.

Upon receiving confirmation from the publishing user (e.g., operation 715), or if the collection management system 204 determines that the edit to the content collection is not the first edit to the content collection of the session, the collection management system 204 determines whether the content collection is locked for editing by another publishing user (e.g., operation 720). If the collection management system 204 determines that the content collection is not locked for editing by another publishing user, the collection management system 204 adds the edit to the content collection to the publishing queue (e.g., operation 625). If the collection management system 204 determines that the content collection is locked for editing by another publishing user, the collection management system 204 causes display of a modal 1006 in the publisher interface 208, which provides the publishing user with the option to take over control of editing the content collection from the other publishing user (e.g., operation 725). Upon receiving confirmation from the publishing user to take over control of editing the content collection from the other publishing user through selection of a "Take Over" button included in the modal 1006, or if the collection management system 204 determines that the content collection is not locked for editing by another publishing user, the collection management system 204 adds the edit to the content collection to the publishing queue (e.g., operation 625).

Figure 11:
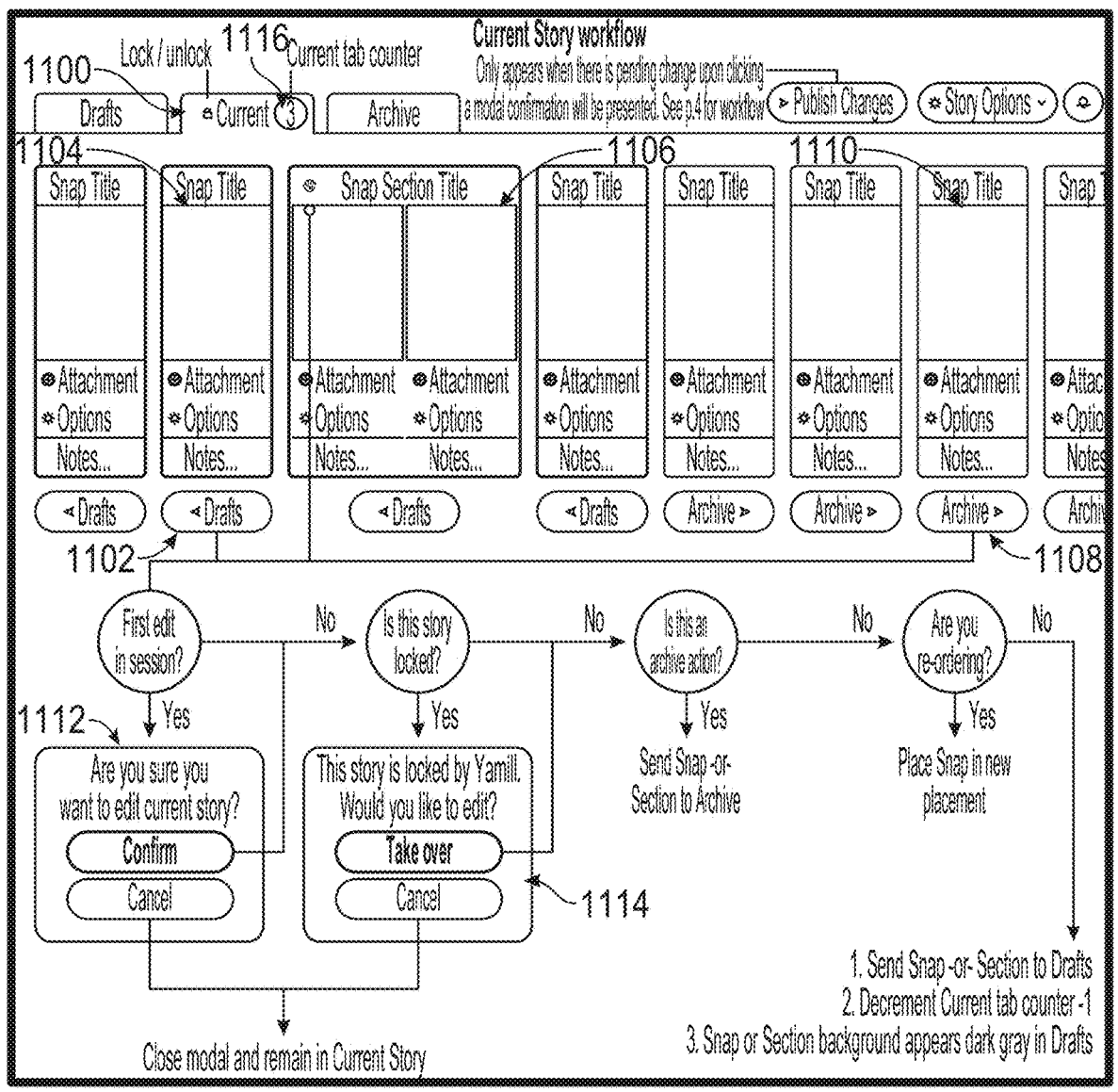

FIG. 11 illustrates a graphical representation of a work flow related to user interaction with a current panel 1100 of the publisher interface 208, according to some example embodiments. As shown, a publishing user may: (1) select a button 1102 to return a content item 1104 to the drafts panel 1000; (2) move a content section 1106 to a different position; or (3) select a button 1108 to add a content item 1110 to the archive library. Upon detecting the publishing user performing any one of these actions, the collection management system 204 determines whether the edit (i.e., adding the content item to the drafts panel, adding the content item to the archive library, or reordering content items in the content collection) to the content collection is the first edit by the publishing user during the session. If the collection management system 204 determines that the edit to the content collection is the first edit to the content collection of the session, the collection management system 204 causes display of a modal 1112 in the publisher interface 208, which prompts the publishing user to confirm the intent to edit.

Upon receiving confirmation from the publishing user, or if the collection management system 204 determines that the edit to the content collection is not the first edit to the content collection of the session, the collection management system 204 determines whether the content collection is locked for editing by another publishing user. If the collection management system 204 determines that the content collection is locked for editing by another publishing user, the collection management system 204 causes display of a modal 1114 in the publisher interface 208, which provides the publishing user with the option to take over control of editing the content collection from the other publishing user.

Upon receiving confirmation to take over control of editing the content collection, or if the collection management system 204 determines that the content collection is not locked for editing by another publishing user, the collection management system 204 determines whether the user action corresponds to a request to add the content item 1110 to the archive library. If the action corresponds to a request to add the content item 1110 to the archive library, the collection management system 204 adds the content item 1110 to the archive library.

If the action does not correspond to the request to add the content item 1110 to the archive library, the collection management system 204 determines whether the user action corresponds to a reordering of content items in the content collection (e.g., moving the content section 1106 to a different position). If the user action corresponds to the reordering of content items in the content collection, the collection management system 204 reorders the content items of the content collection by moving the content section 1106 to the position specified by the publishing user. Otherwise, the collection management system 204 returns the content item 1104 to the drafts panel 1000 (the only remaining user action). The collection management system 204 further decrements an edit counter 1116 based on the content item 1104 being returned to the drafts panel 1000.

Figure 12:
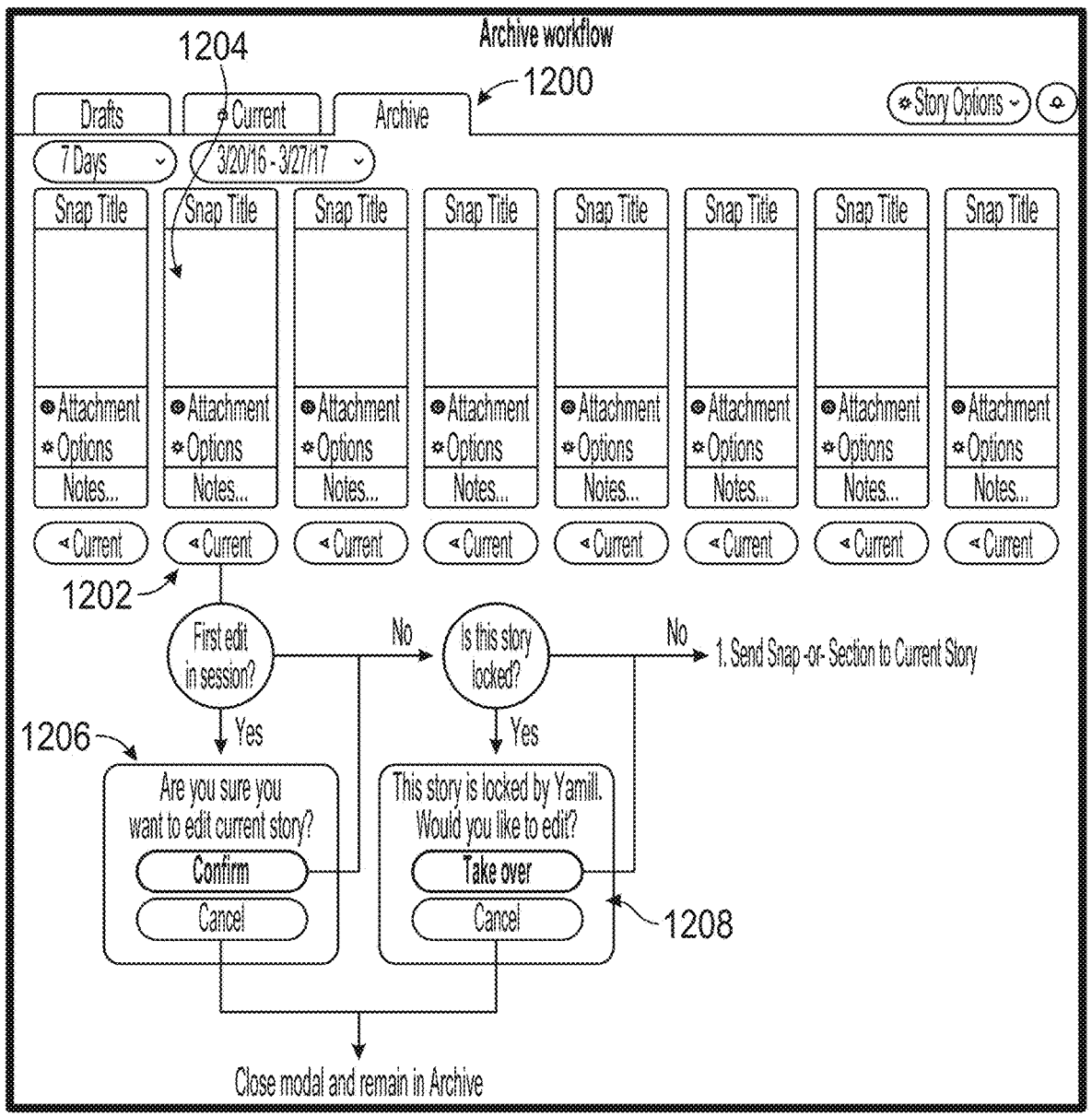

FIG. 12 illustrates a graphical representation of a work flow related to user interaction with an archive panel 1200 of the publisher interface 208, according to some example embodiments. Content items shown within the archive panel 1200 are included in an archive library of the publisher. As shown, a publishing user may select a button 1202 to add an archived content item 1204 to the publishing queue. In response to user selection of the button 1202, the collection management system 204 determines whether the edit (i.e., adding the archived content item 1204 to the publishing queue) to the content collection is the first edit by the publishing user during the session. If the collection management system 204 determines that the edit to the content collection is the first edit to the content collection of the session, the collection management system 204 causes display of a modal 1206 in the publisher interface 208, which prompts the publishing user to confirm the request to add the archived content item 1204 to the publishing queue.

Upon receiving confirmation from the publishing user, or if the collection management system 204 determines that the edit to the content collection is not the first edit to the content collection of the session, the collection management system 204 determines whether the content collection is locked for editing by another publishing user. If the collection management system 204 determines that the content collection is locked for editing by another publishing user, the collection management system 204 causes display of a modal 1208 in the publisher interface 208, which provides the publishing user with the option to take over control of editing the content collection from the other publishing user.

Upon receiving confirmation to take over control of editing the content collection, or if the collection management system 204 determines that the content collection is not locked for editing by another publishing user, the collection management system 204 adds the archived content item 1204 to the publishing queue.

Figure 13:
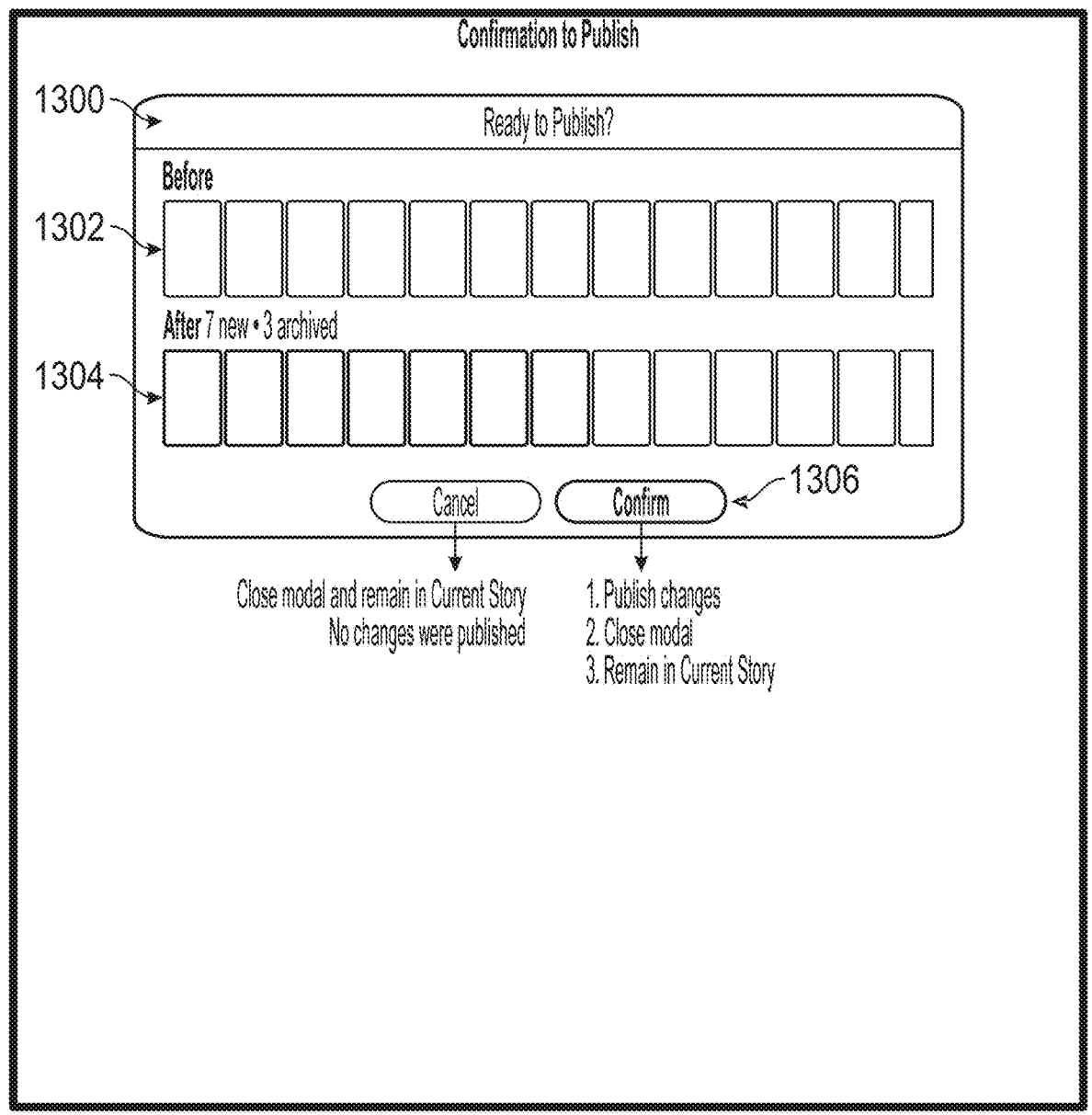

FIG. 13 illustrates a graphical representation of a prompt 1300 to confirm publishing of an edit to a content collection, according to some example embodiments. As shown, the prompt 1300 includes a representation 1302 of the content collection prior to publishing the edit. The prompt 1300 further includes a graphical representation 1304 of the content collection subsequent to publishing the edit. The graphical representation 1304 provides an indication of additional content items added to the content collection along with a textual description of a number of content items being added to the content collection and a number of content items being removed (e.g., archived) from the content collection. The prompt 1300 further includes a button 1306 to confirm the publishing of the edit to the content collection. Upon receiving user selection of the button 1306, the collection management system 204 publishes the edit.

FIGS. 14A-D illustrate graphical representations of changes to a content collection as a result of publishing an edit to the content collection. More specifically, each of the FIGS. 14A-D illustrates a manner in which content collection read states, tiles, and read points are updated in response to insertion of new content items into the content collection, according to a different scenario.

Figure 14A:
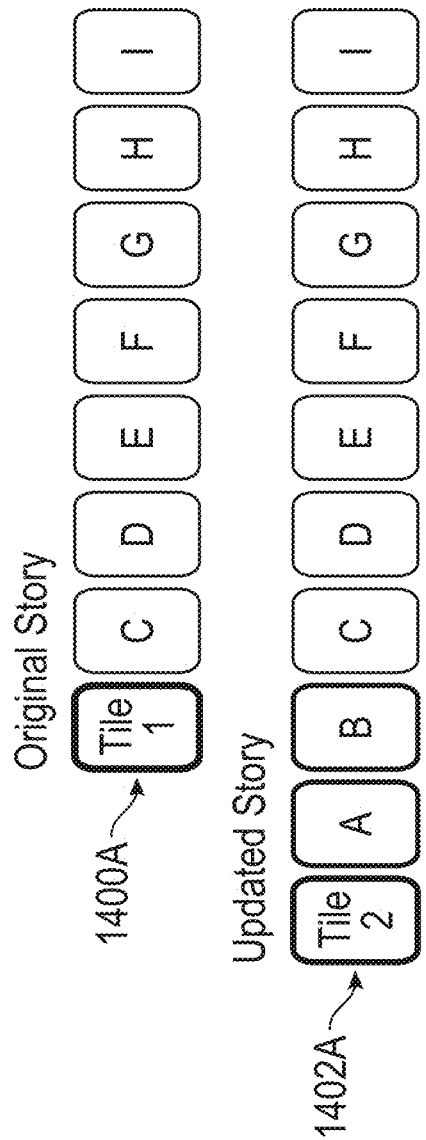

FIG. 14A illustrates the scenario when a publishing user adds content items to an unread content collection (e.g., no content items in the content collection have a read state of "read"). As shown, an original content collection 1400A includes content items "C," "D," "E," "F," "G," "H," and "I" and a tile "1." In this example, the publishing user adds content items "A" and "B" to the original content collection 1400A before content item "C." Accordingly, an updated content collection 1402A includes content items "A," "B," "C," "D," "E," "F," "G," "H," and "I," in that order. Further, tile "1" in the original content collection 1400A has been replaced with tile "2" in the updated content collection 1402A based on the addition of the content items "A" and "B." Moreover, given that the original content collection 1400A is unread, the read point for the updated content collection 1402A is updated to correspond to content item "A." In other words, upon selecting the tile "2" to view the updated content collection 1402A, a user will be presented first with the content item "A."

Figure 14B:
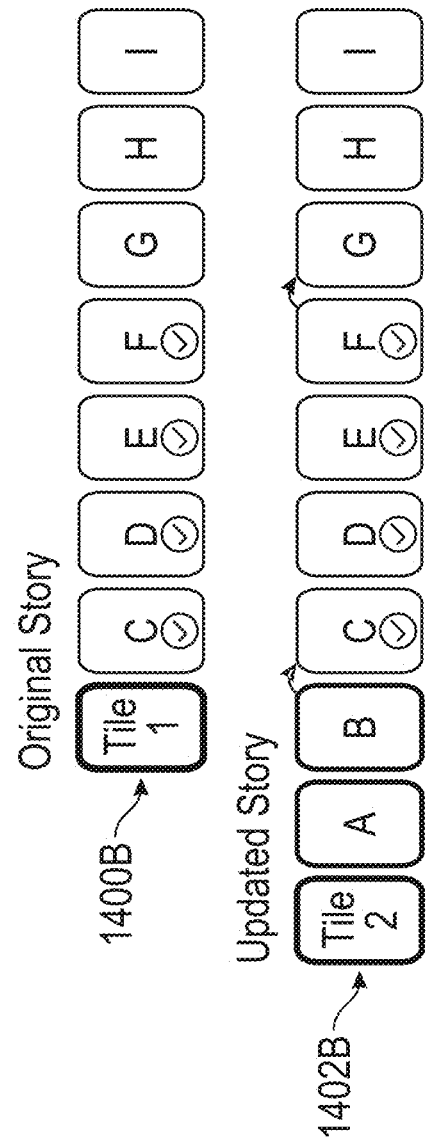

FIG. 14B illustrates the scenario when a publishing user adds content items to a partially read content collection (e.g., a portion, but not all, of content items in the content collection have a read state of "read"). As shown, an original content collection 1400B includes content items "C," "D," "E," "F," "G," "H," and "I" and a tile "1." Content items "C," "D," "E," and "F" include a check mark to indicate that these content items have been read (e.g., read state of the content items is "Read"). In this example, the publishing user adds content items "A" and "B" to the original content collection 1400B before content item "C." Accordingly, an updated content collection 1402B includes content items "A," "B," "C," "D," "E," "F," "G," "H," and "I" in that order. Further, tile "1" in the original content collection 1400B has been replaced with tile "2" in the updated content collection 1402B based on the addition of the content items "A" and "B." Moreover, given that the original content collection 1400B is partially read, the read point for the updated content collection 1402B is updated to correspond to content item "A" instead of content item "G," which is otherwise the next unread content item in the sequence. In other words, upon selecting the tile "2" to view the updated content collection 1402B, a user will be presented first with the content item "A" instead of content item "G," which would have been the case if the publishing user did not add content items "A" and "B." Additionally, the read order is updated such that the read content items between content item "B" and content item "G" are skipped so that the user is presented with only unread content items.

FIG. 14C illustrates the scenario when a publishing user adds content items to a fully read content collection (e.g., all of the content items in the content collection have a read state of "read"). As shown, an original content collection 1400C includes content items "C," "D," "E," "F," "G," "H," and "I" and a tile "1." Content items "C," "D," "E," "F," "G," "H," and "I" include a check mark to indicate that these content items have been read (e.g., read state of content items is "Read"). In this example, the publishing user adds content items "A" and "B" to the original content collection 1400C before content item "C." Accordingly, an updated content collection 1402C includes content items "A," "B," "C," "D," "E," "F," "G," "H," and "I" in that order. Additionally, the read state of the content collection is updated from "Read" to "Partially Read" based on the inclusion of the content items "A" and "B," which are heretofore unread. Further, tile "1" in the original content collection 1400C has been replaced with tile "2" in the updated content collection 1402C based on the addition of the content items "A" and "B" into the updated content collection 1402C and the updated read state. Moreover, given that the original content collection 1400C is fully read, the read point for the updated content collection 1402C is updated to correspond to content item "A." Additionally, given that the remaining content items in the updated content collection 1402C are read, once a user finishes viewing content item "B," the user is exited from the updated content collection 1402C and the read state is returned to "Read."

FIG. 14D illustrates the scenario when a publishing user adds content items to a fully read content collection (e.g., all of the content items in the content collection have a read state of "read") in a different order than that of the example illustrated in FIG. 14C. As shown, an original content collection 1400D includes content items "C," "D," "E," "F," "G," "H," and "I" and a tile "1." Content items "C," "D," "E," "F," "G," "H," and "I" include a check mark to indicate that these content items have been read (e.g., read state of content items is "Read"). In this example, the publishing user adds content items "A" and "B" to the original content collection 1400D in between content items "E" and "F." Accordingly, an updated content collection 1402D includes content items "C," "D," "E," "A," "B," "F," "G," "H," and "I" in that order. Additionally, the read state of the content collection is updated from "Read" to "Partially Read" based on the inclusion of the content items "A" and "B," which are heretofore unread. Further, tile "1" in the original content collection 1400D has been replaced with tile "2" in the updated content collection 1402D based on the addition of the content items "A" and "B" into the updated content collection 1402D and the updated read state. Moreover, given that the original content collection 1400D is fully read, the read point for the updated content collection 1402D is updated to correspond to content item "A" despite there being content items that precede content item "A" in the sequence. Additionally, given that the remaining content items in the updated content collection 1402D are read, once a user finishes viewing content item "B," the user is exited from the updated content collection 1402D and the read state is returned to "Read."

Software Architecture

Figure 15:
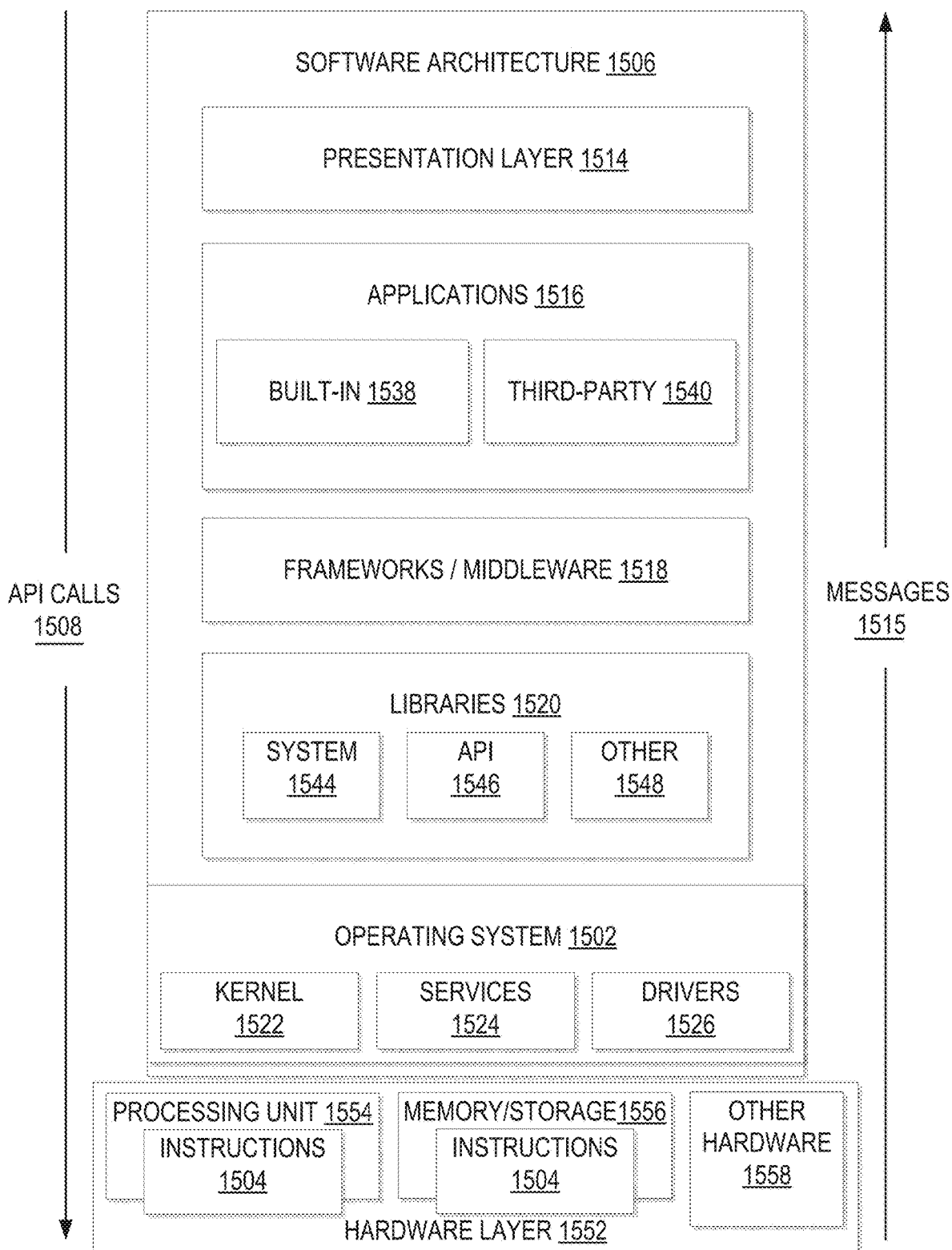
FIG. 15 is a block diagram illustrating a representative software architecture, which may be used in conjunction with various hardware architectures herein described, according to example embodiments.

FIG. 15 is a block diagram illustrating an example software architecture 1506, which may be used in conjunction with various hardware architectures herein described. FIG. 15 is a non-limiting example of a software architecture and it will be appreciated that many other architectures may be implemented to facilitate the functionality described herein. The software architecture 1506 may execute on hardware such as a machine 1600 of FIG. 16 that includes, among other things, processors 1604, memory/storage 1606 and I/O components 1618. A representative hardware layer 1552 is illustrated and can represent, for example, the machine 1600 of FIG. 16. The representative hardware layer 1552 includes a processing unit 1554 having associated executable instructions 1504. The executable instructions 1504 represent the executable instructions of the software architecture 1506, including implementation of the methods, components, and so forth described herein. The hardware layer 1552 also includes memory and/or storage modules memory/storage 1556, which also have the executable instructions 1504. The hardware layer 1552 may also comprise other hardware 1558.

In the example architecture of FIG. 15, the software architecture 1506 may be conceptualized as a stack of layers where each layer provides particular functionality. For example, the software architecture 1506 may include layers such as an operating system 1502, libraries 1520, frameworks/middleware 1518, applications 1516, and a presentation layer 1514. Operationally, the applications 1516 and/or other components within the layers may invoke application programming interface (API) calls 1508 through the software stack and receive a response to the API calls 1508 as messages 1515. The layers illustrated are representative in nature and not all software architectures have all layers. For example, some mobile or special-purpose operating systems may not provide a frameworks/middleware 1518, while others may provide such a layer. Other software architectures may include additional or different layers.

The operating system 1502 may manage hardware resources and provide common services. The operating system 1502 may include, for example, a kernel 1522, services 1524, and drivers 1526. The kernel 1522 may act as an abstraction layer between the hardware and the other software layers. For example, the kernel 1522 may be responsible for memory management, processor management (e.g., scheduling), component management, networking, security settings, and so on. The services 1524 may provide other common services for the other software layers. The drivers 1526 are responsible for controlling or interfacing with the underlying hardware. For instance, the drivers 1526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1520 provide a common infrastructure that is used by the applications 1516 and/or other components and/or layers. The libraries 1520 provide functionality that allows other software components to perform tasks in an easier fashion than by interfacing directly with the underlying operating system 1502 functionality (e.g., kernel 1522, services 1524, and/or drivers 1526). The libraries 1520 may include system libraries 1544 (e.g., C standard library) that may provide functions such as memory allocation functions, string manipulation functions, mathematical functions, and the like. In addition, the libraries 1520 may include API libraries 1546 such as media libraries (e.g., libraries to support presentation and manipulation of various media formats such as MPEG4, H.2154, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1520 may also include a wide variety of other libraries 1548 to provide many other APIs to the applications 1516 and other software components/modules.

The frameworks/middleware 1518 provide a higher-level common infrastructure that may be used by the applications 1516 and/or other software components/modules. For example, the frameworks/middleware 1518 may provide various graphic user interface (GUI) functions, high-level resource management, high-level location services, and so forth. The frameworks/middleware 1518 may provide a broad spectrum of other APIs that may be utilized by the applications 1516 and/or other software components/modules, some of which may be specific to a particular operating system 1502 or platform.

The applications 1516 include built-in applications 1538 and/or third-party applications 1540. Examples of representative built-in applications 1538 may include, but are not limited to, a contacts application, a browser application, a book reader application, a location application, a media application, a messaging application, and/or a game application. The third-party applications 1540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1540 may invoke the API calls 1508 provided by the mobile operating system (such as the operating system 1502) to facilitate functionality described herein.

The applications 1516 may use built-in operating system functions (e.g., kernel 1522, services 1524, and/or drivers 1526), libraries 1520, and frameworks/middleware 1518 to create user interfaces to interact with users of the system. Alternatively, or additionally, in some systems interactions with a user may occur through a presentation layer, such as the presentation layer 1514. In these systems, the application/component "logic" can be separated from the aspects of the application/component that interact with a user.

Figure 16:
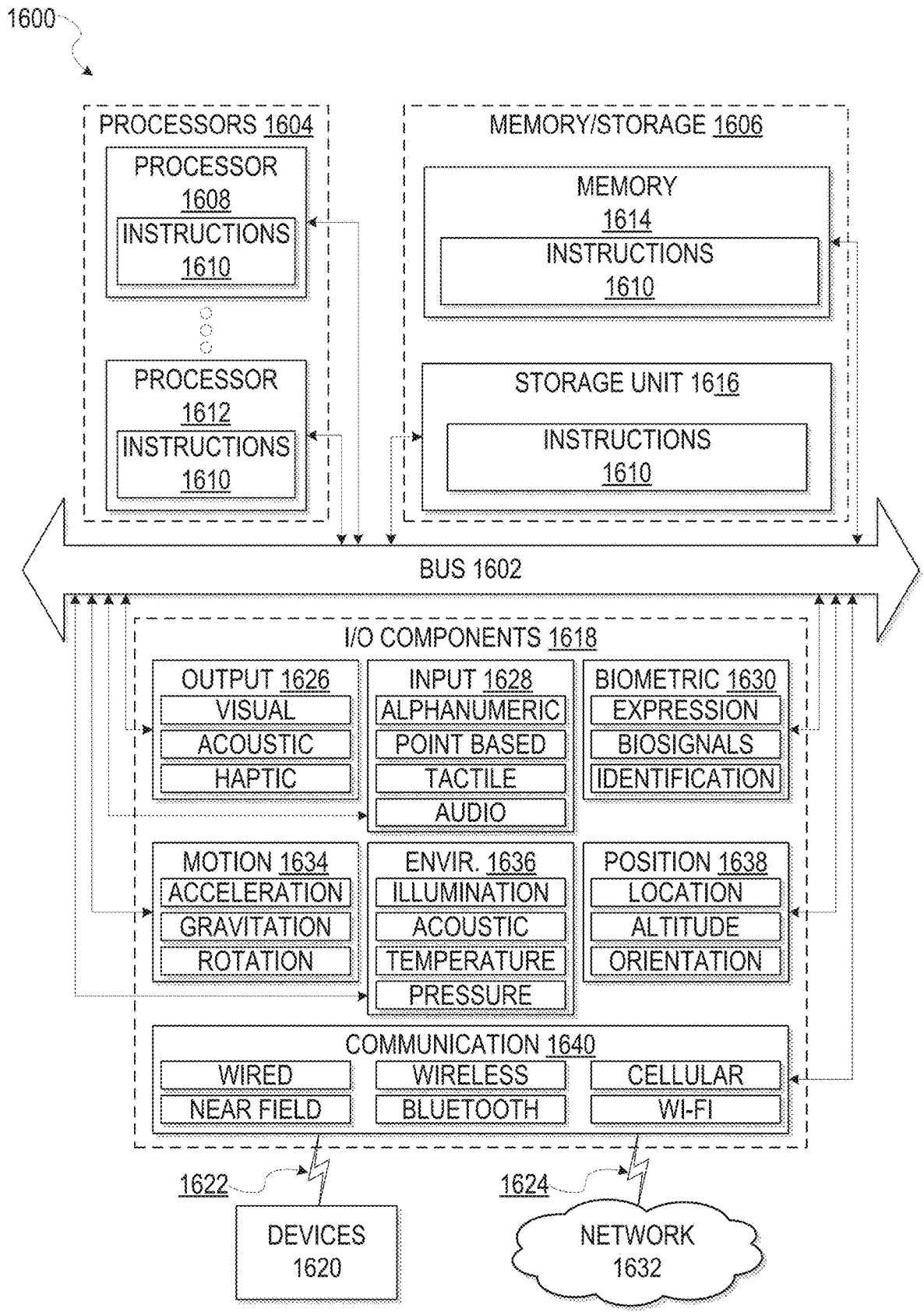
FIG. 16 is a block diagram illustrating components of a machine able to read instructions from a machine-readable medium (e.g., a machine-readable storage medium) and perform any one or more of the methodologies discussed herein, according to example embodiments.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1610 (e.g., software, a program, an application, an applet, an app, or other executable code) for causing the machine 1600 to perform any one or more of the methodologies discussed herein may be executed. As such, the instructions 1610 may be used to implement modules or components described herein. The instructions 1610 transform the general, non-programmed machine 1600 into a particular machine 1600 programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1610, sequentially or otherwise, that specify actions to be taken by the machine 1600. Further, while only a single machine 1600 is illustrated, the term "machine" shall also be taken to include a collection of machines that individually or jointly execute the instructions 1610 to perform any one or more of the methodologies discussed herein.

The machine 1600 may include processors 1604, memory/storage 1606, and I/O components 1618, which may be configured to communicate with each other such as via a bus 1602. In an example embodiment, the processors 1604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1608 and a processor 1612 that may execute the instructions 1610. Although FIG. 16 shows multiple processors, the machine 1600 may include a single processor with a single core, a single processor with multiple cores (e.g., a multi-core processor), multiple processors with a single core, multiple processors with multiple cores, or any combination thereof.

The memory/storage 1606 may include a memory 1614, such as a main memory, or other memory storage, and a storage unit 1616, both accessible to the processors 1604 such as via the bus 1602. The storage unit 1616 and memory 1614 store the instructions 1610 embodying any one or more of the methodologies or functions described herein. The instructions 1610 may also reside, completely or partially, within the memory 1614, within the storage unit 1616, within at least one of the processors 1604 (e.g., within the processor's cache memory), or any suitable combination thereof, during execution thereof by the machine 1600. Accordingly, the memory 1614, the storage unit 1616, and the memory of the processors 1604 are examples of machine-readable media.

The I/O components 1618 may include a wide variety of components to receive input, provide output, produce output, transmit information, exchange information, capture measurements, and so on. The specific I/O components 1618 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1618 may include many other components that are not shown in FIG. 16. The I/O components 1618 are grouped according to functionality merely for simplifying the following discussion, and the grouping is in no way limiting. In various example embodiments, the I/O components 1618 may include output components 1626 and input components 1628. The output components 1626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1618 may include biometric components 1630, motion components 1634, environment components 1636, or position components 1638, among a wide array of other components. For example, the biometric components 1630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1634 may include acceleration sensor components (e.g., accelerometer), gravitation sensor components, rotation sensor components (e.g., gyroscope), and so forth. The environment components 1636 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1638 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1618 may include communication components 1640 operable to couple the machine 1600 to a network 1632 or devices 1620 via a coupling 1624 and a coupling 1622, respectively. For example, the communication components 1640 may include a network interface component or other suitable device to interface with the network 1632. In further examples, the communication components 1640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1620 may be another machine or any of a wide variety of peripheral devices (e.g., a peripheral device coupled via a Universal Serial Bus (USB)).

Moreover, the communication components 1640 may detect identifiers or include components operable to detect identifiers. For example, the communication components 1640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4116, Ultra Code, UCC RSS-2D bar code, and other optical codes), or acoustic detection components (e.g., microphones to identify tagged audio signals). In addition, a variety of information may be derived via the communication components 1640, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    accessing, by a client device from a network accessible database, a content collection comprising a plurality of content items ordered in a sequence specified by a publishing user;
    presenting, on a display of the client device, a tile comprising a thumbnail image indicating an existence of the content collection, user selection of the tile providing access to the content collection, the tile including a visual indicator of a content collection read state of the content collection, the content collection read state comprising one of: read, unread, or partially read, the content collection read state being based on individual content item read states corresponding to the plurality of content items, a read state associated with an individual content item indicating whether a user of the client device has viewed the individual content item;
    accessing, by the client device from the network accessible database, a first update to the content collection comprising a first new content item selected for inclusion in the content collection at a position specified by the publishing user between a first content item and a last content item in the sequence, the first new content item having a content item read state of unread;
    updating the content collection read state from read to partially read based on the inclusion of the first new content item into the content collection and the content item read state of the first new content item being unread;
    updating, on the display of the client device, the tile based on the updating of the content collection read state, the updating of the tile including changing the visual indicator of the content collection read state from read to partially read; and
    updating, by one or more processors of the client device, a read point of the content collection based on the first new content item, the read point corresponding to the first new content item in the sequence of the plurality of content items that is presented upon user selection of the tile, the updating of the read point comprising:
    identifying the first new content item as a first unread content item in the sequence that has not been viewed by the user of the client device; and
    changing the read point of the content collection to the position of the first new content item between the first content item and the last content item in the sequence.

2. The method of claim 1, wherein the first update to the content collection further comprises a removal of a selected content item from the content collection at the position specified by the publishing user, the first new content item replacing the selected content item.

3. The method of claim 1, wherein the visual indicator of the content collection read state being a partially read is one of a symbol, a border, or shading.

4. The method of claim 1, further comprising accessing a second update to the content collection comprising a second new content item selected for inclusion in the content collection at a position specified by the publishing user between the first new content item and the last content item in the sequence, the second new content item having a content item read state of unread.

5. The method of claim 4, further comprising:
    presenting the first new content item in the content collection based on a selection of the content collection;
    presenting the second new content item in the content collection subsequent to presenting the first new content item based on the sequence; and
    exiting the content collection subsequent to presenting the second new content item.

6. The method of claim 1, wherein the updating the tile includes:
    selecting an alternative thumbnail image from among a plurality of thumbnail images designated as possible tiles for the content collection; and
    replacing the thumbnail image with the alternative thumbnail image.

7. The method of claim 1, further comprising determining preferences of the user by monitoring interactions of the user with previously presented content items and tags associated with the previously presented content items.

8. The method of claim 1, further comprising automatically removing at least one content item from the content collection based on the at least one content item having a user engagement score below a threshold user engagement score.

9. The method of claim 1, wherein the content collection is deleted from the client device in response to an ephemeral message deletion trigger.

10. The method of claim 1, wherein the first new content item is inserted into the content collection at a scheduled time specified by the publishing user.

11. The method of claim 1, further comprising:
    providing a content management interface to an additional client device operated by the publishing user;
    receiving, via the content management interface, the first update to the content collection;
    receiving, via the content management interface, a request to add the first update to a publishing queue;
    in response to receiving the request:
        adding the first update to the publishing queue; and
        locking the content collection for editing by the publishing user; and
    receiving, via the content management interface, a request to publish the first update to the content collection;
    wherein an inserting of the first new content item into the content collection is in response to receiving the request to publish the first update.

12. The method of claim 11, wherein the content management interface includes:
    a drafts panel configured for editing the content collection;
    a current panel configured for publishing the first update to the content collection, the current panel providing access to the publishing queue; and
    an archive panel configured for archiving one or more content items from the content collection.

13. The method of claim 11, wherein the request to publish the first update to the content collection includes one or more temporal constraints on publishing of the first update to the content collection, the one or more temporal constraints including at least one of a scheduled time for the publishing of the first update, or an expiration time for keeping the first update published.

14. A system comprising:
    one or more processors of a server machine; and
    a memory coupled to the one or more processors and storing instructions that, when executed by the one or more processors, cause the server machine to perform operations comprising:
        accessing, at the server machine from a network accessible database, a content collection comprising a plurality of content items ordered in a sequence specified by a publishing user;
        causing, by the server machine, presentation of a tile on a display of a first client device, the tile comprising a thumbnail image indicating an existence of the content collection, user selection of the tile providing access to the content collection, the tile including a visual indicator of a content collection read state of the content collection, the content collection read state comprising one of: read, unread, or partially read, the content collection read state being based on individual content item read states corresponding to the plurality of content items, a read state associated with an individual content item indicating whether a user of the first client device has viewed the individual content item;
        receiving, at the server machine from a second client device operated by the publishing user, an update to the content collection comprising a first new content item selected for inclusion in the content collection at a position specified by the publishing user between a first content item and a last content item in the sequence, the first new content item having a content item read state of unread;
        inserting, by the server machine, the first new content item into the content collection stored on the network accessible database;
        updating the content collection read state from read to partially read based on the inclusion of the first new content item into the content collection and the content item read state of the first new content item being unread;
        updating, on the display of the first client device, the presentation of the tile based on the updating of the content collection read state, the updating of the tile changing the visual indicator of the content collection read state from read to partially read; and updating, by one or more processors of the first client device, a read point of the content collection based on the first new content item, the read point corresponding to the first new content item in the sequence of the plurality of content items that is presented upon user selection of the tile, the updating of the read point comprising:
- identifying the first new content item as a first unread content item in the sequence that has not been viewed by the user of the first client device; and
- changing the read point of the content collection to the position of the first new content item between the first content item and the last content item in the sequence.

15. The system of claim 14, wherein the operations further comprise:
providing a content management interface to the second client device operated by the publishing user, the update to the content collection being received via the content management interface;
receiving, via the content management interface, a request to add the update to a publishing queue;
in response to receiving the request:
- adding the update to the publishing queue; and
- locking the content collection for editing by the publishing user; and receiving, via the content management interface, a request to publish the update to the content collection;
wherein the inserting of the first new content item into the content collection is in response to receiving the request to publish the update.

16. The system of claim 15, wherein the operations further comprise:
determining that the update to the content collection is a first edit to the content collection during a communication session with an additional client device; and
in response to determining that the update to the content collection is the first edit to the content collection during the communication session, causing display of a prompt on the additional client device for the publishing user to confirm the update to the content collection;
wherein the update to the content collection is added to the publishing queue in response to receiving confirmation of the update to the content collection from the additional client device.

17. The system of claim 15, wherein the operations further comprise:
receiving, via the content management interface, a request to archive an existing content item included in the content collection;
removing the existing content item from the content collection in response to receiving the request; and
adding the existing content item to an archive library associated with the publishing user.

18. A non-transitory computer-readable medium storing instructions that, when executed by a computer system, cause the computer system to perform operations comprising:
accessing, from a network accessible database, a content collection comprising a plurality of content items ordered in a sequence specified by a publishing user;
causing presentation of a tile on a display of a client device, the tile comprising a thumbnail image indicating an existence of the content collection, user selection of the tile providing access to the content collection, the tile including a visual indicator of a content collection read state of the content collection, the content collection read state comprising one of: read, unread, or partially read, the content collection read state being based on individual content item read states corresponding to the plurality of content items, a read state associated with an individual content item indicating whether a user of the client device has viewed the individual content item;
accessing, from the network accessible database, an update to the content collection comprising a first new content item selected for inclusion in the content collection at a position specified by the publishing user between a first content item and a last content item in the sequence, the first new content item having a content item read state of unread;
updating the content collection read state from read to partially read based on the inclusion of the first new content item into the content collection and the content item read state of the first new content item being unread;
updating, on the display of the client device, presentation of the tile based on the updating of the content collection read state, the updating of the tile including changing the visual indicator of the content collection read state from read to partially read; and
updating, by one or more processors of the client device, a read point of the content collection based on the first new content item, the read point corresponding to the first new content item in the sequence of the plurality of content items that is presented upon user selection of the tile, the updating of the read point comprising:
- identifying the first new content item as a first unread content item in the sequence that has not been viewed by the user of the client device; and
- changing the read point of the content collection to the position of the first new content item between the first content item and the last content item in the sequence.

19. The non-transitory computer-readable medium of claim 18, wherein the update to the content collection further comprises a removal of a selected content item from the content collection at the position specified by the publishing user, the first new content item replacing the selected content item.

20. The non-transitory computer-readable medium of claim 18, wherein the visual indicator of the content collection read state being a partially read is one of a symbol, a border, or shading.

* * * * *